(12) United States Patent
Yamato et al.

(10) Patent No.: US 7,559,074 B2
(45) Date of Patent: Jul. 7, 2009

(54) PROGRAM PROCESSING APPARATUS, PROGRAM PROCESSING SYSTEM, AND PROGRAM

(75) Inventors: Jun-ichi Yamato, Tokyo (JP); Akihisa Kenmochi, Tokyo (JP)

(73) Assignee: NEC Corporation, Tokyo (JP)

( * ) Notice: Subject to any disclaimer, the term of this patent is extended or adjusted under 35 U.S.C. 154(b) by 1086 days.

(21) Appl. No.: 10/050,162

(22) Filed: Jan. 18, 2002

(65) Prior Publication Data

US 2002/0100049 A1 Jul. 25, 2002

(30) Foreign Application Priority Data

Jan. 19, 2001 (JP) .............................. 2001-011765

(51) Int. Cl.
*H04N 5/445* (2006.01)
*H04N 7/173* (2006.01)
*G06F 13/00* (2006.01)
*H04N 7/14* (2006.01)

(52) U.S. Cl. ........................... 725/58; 725/50; 725/132; 386/35; 386/65; 386/83

(58) Field of Classification Search .................. 725/50, 725/55, 58, 27–28, 114, 47, 132, 140, 152; 386/36, 65, 83

See application file for complete search history.

(56) References Cited

U.S. PATENT DOCUMENTS

| 5,699,107 | A | * | 12/1997 | Lawler et al. ................. 725/58 |
| 5,793,438 | A | * | 8/1998 | Bedard .......................... 725/43 |
| 5,872,588 | A | * | 2/1999 | Aras et al. ..................... 725/14 |
| 6,023,267 | A | * | 2/2000 | Chapuis et al. ............. 715/810 |
| 6,532,589 | B1 | * | 3/2003 | Proehl et al. .................. 725/40 |
| 6,642,939 | B1 | * | 11/2003 | Vallone et al. ............... 725/721 |
| 6,772,433 | B1 | * | 8/2004 | LaJoie et al. ................. 725/52 |
| 6,898,762 | B2 | * | 5/2005 | Ellis et al. .................... 715/716 |
| 6,951,031 | B2 | * | 9/2005 | Hatano ........................ 725/50 |
| 6,971,119 | B1 | * | 11/2005 | Arsenault et al. ............. 725/89 |
| 2003/0044165 | A1 | * | 3/2003 | Wood et al. .................. 386/83 |
| 2005/0002649 | A1 | * | 1/2005 | Boyle et al. .................. 386/83 |
| 2005/0251831 | A1 | * | 11/2005 | Young et al. .................. 725/58 |
| 2006/0083484 | A1 | * | 4/2006 | Wada et al. .................... 386/83 |

FOREIGN PATENT DOCUMENTS

| JP | 2000-069380 | 3/2000 |
| JP | 2000-307993 | 11/2000 |

* cited by examiner

*Primary Examiner*—Christopher Kelley
*Assistant Examiner*—Reuben M Brown
(74) *Attorney, Agent, or Firm*—Whitham Curtis Christofferson & Cook, P.C.

(57) ABSTRACT

A program processing apparatus and system is disclosed by which an electronic program guide can be used to confirm a condition of each program readily and perform various operations for a program. The program management apparatus is formed from a personal computer having functions for performing recording and playback of a program, a video tape recorder having a function for acquiring an electronic program guide, or a like apparatus. The program management apparatus includes a program recording section, a program playback section, a program guide displaying section which issues an instruction to perform a suitable program process in response to an operation of an electronic program guide displayed thereon, a recording reservation management section, and a program guide preparation section for preparing an electronic program guide. The program management apparatus further includes a program guide database, a program recording reservation database and a recorded program database.

10 Claims, 29 Drawing Sheets

FIG. 4

XX (MONTH) XX (DAY), 2001

|  | BROADCASTING STATION A | BROADCASTING STATION B | BROADCASTING STATION C | BROADCASTING STATION D |
|---|---|---|---|---|
| 20 | PROGRAM A, RECORDED | PROGRAM E, NOT RECORDED | PROGRAM H, BEING BROADCAST | PROGRAM J, BEING BROADCAST |
|  | PROGRAM B, NOT RECORDED | | | |
| 21 | PROGRAM C, BEING BROADCAST | PROGRAM F, BEING RECORDED | | PROGRAM K, NOT RESERVED FOR RECORDING |
| 22 | PROGRAM D, NOT RESERVED FOR RECORDING | PROGRAM G, NOT RESERVED FOR RECORDING | PROGRAM I, RESERVED FOR RECORDING | |

PROGRAM PROCESSING APPARATUS, PROGRAM PROCESSING SYSTEM, AND PROGRAM

BACKGROUND OF THE INVENTION

1. Field of the Invention

The present invention relates to an apparatus and a system by which an electronic program guide (EPG) is prepared and used to play back or record a program.

2. Description of the Related Art

Conventionally, some apparatus such as a video tape recorder (VTR) or a personal computer having a function of recording a television program have a function of acquiring an electronic program guide included in a television broadcasting wave or an electronic program guide distributed from a server on the Internet and using the acquired electronic program guide to search for a particular program An apparatus of the type described can use an electronic program guide to reserve recording of a program.

Japanese Patent Laid-Open No. 2000-307993 discloses a system which uses an electronic program guide to reserve recording of a program. The system searches for programs relating to a homepage on the Internet to prepare a program guide and performs reservation of recording of a program or playback of a recorded program from the program guide.

In the system described, however, an electronic program guide to be used is prepared by a proxy server which is owned commonly by a plurality of clients of a subscriber and serves also as a video server or an apparatus for use to record and enjoy a program. Therefore, the system cannot process a program using an electronic program guide distributed from a server on the Internet.

Meanwhile, Japanese Patent Laid-Open No. 2000-69380 discloses a character multiplex broadcast reception apparatus wherein a condition of a program is displayed on an electronic program guide. In the character multiplex broadcast reception apparatus, such a condition as a recording-reserved condition, a recording proceeding condition or an already-recorded condition is indicated in an electronic program guide sent by a broadcasting wave.

In recent years, a personal computer having a program recording function of the type which uses a browser to display an electronic program guide provided in a Bite on the Internet and reserves recording of a program in accordance with a method called iEPG (Internet Electronic Program Guide) has been put into practical use.

While an electronic program guide is used for reservation of recording of a program, a personal computer of the type described does not allow confirmation of recording conditions of individual programs using an electronic program guide sent thereto through the Internet or by a broadcasting wave or does not allow operation of a program such as playback using an electronic program guide.

SUMMARY OF THE INVENTION

It is an object of the present invention to provide a program processing apparatus and system by which an electronic program guide can be used to confirm a condition of each program readily and perform various operations for a program.

In order to attain the object described above, according to an aspect of the present invention, there is provided a program processing apparatus, comprising electronic program guide acquisition means for acquiring an electronic program guide, condition determination means for determining a condition of each of programs to be displayed on the electronic program guide, electronic program guide displaying means for displaying the electronic program guide in a display form wherein the electronic program guide reflects the conditions of the programs determined by the condition determination means, and program processing means operable in response to selection, by a user, of one of the programs included in the electronic program guide displayed by the electronic program guide displaying means for executing a program process in accordance with the condition of the selected program.

With the program processing apparatus, a program guide from which conditions of programs can be grasped readily can be displayed, and the program guide can be used to perform such a program process as recording or playback.

According to another aspect of the present invention, there is provided a program processing system for performing a program process using an electronic program guide, comprising a program processing apparatus for executing a program process, and an electronic program guide preparation server for preparing an electronic program guide, the electronic program guide preparation server including reception means for receiving data regarding programs through a communication network, determination means for determining a condition of each of the programs based on the data regarding the programs, electronic program guide preparation means for preparing an electronic program guide of a modified display form wherein a selection section for performing a process in accordance with the condition of each of the programs is displayed, and transmission means for transmitting the prepared electronic program guide to the program processing apparatus, the program processing apparatus including electronic program guide displaying means for displaying the electronic program guide received through the communication network and program processing means operable in response to selection of one of the selection sections displayed on the electronic program guide for executing a program process corresponding to the selected selection section.

With the program processing system, conditions of programs can be grasped readily using a program guide acquired through the network, and the program guide can be used to perform such a program process as recording or playback.

According to a further aspect of the present invention, there is provided a program processing system for performing a program process using an electronic program guide, comprising a program processing apparatus for executing a program process, and an electronic program guide preparation server for preparing an electronic program guide, the electronic program guide preparation server including electronic program guide preparation means for preparing an electronic program guide in which a link to be handled by the program processing apparatus is embedded and transmission means for transmitting the electronic program guide prepared by the electronic program guide preparation means, the program processing apparatus including displaying means for displaying an electronic program guide of a display form modified based on the conditions of the programs to be displayed on the electronic program guide received from the electronic program guide preparation server and program processing means for executing a program process in accordance with the conditions of the programs using the link embedded in the electronic program guide in accordance with an instruction of a user.

With the program processing system, a program guide acquired from a server on the network is converted into a program guide on which conditions of programs are reflected. Thus, the conditions of the programs can be grasped readily using the program guide acquired through the network without sending private information of conditions of programs, and the program guide can be used to perform such a program process as recording or playback.

According to a still further aspect of the present invention, there is provided a program processing system for performing a program process using an electronic program guide, comprising a program processing apparatus for executing a program process, and an electronic program guide preparation server for preparing an electronic program guide, the program processing apparatus including reception means for receiving an electronic program guide from the electronic program guide preparation server and displaying means for preparing an electronic program guide of a display form modified in accordance with the conditions of the programs to be displayed on the electronic program guide and displaying the prepared electronic program guide.

With the program processing system, since a program guide modified in accordance with conditions of programs from a program guide acquired through the network can be used, the conditions of the programs can be grasped readily.

In any of the program processing systems, the electronic program guide preparation server may determine whether or not an electronic program guide should be distributed to the program processing apparatus based on a privacy level of information sent thereto from the program processing apparatus. With the program processing system, operation can be varied in accordance with setting of the user, and a program process can be performed using a program guide acquired through the network with a level of privacy desired by the user.

In any of the program processing systems, a consideration which differs depending upon a privacy level of information sent from the program processing apparatus may be imposed for distribution of an electronic program guide from the electronic program guide preparation server to the program processing apparatus. With the program processing system, a different charge can be imposed in accordance with contents of information distributed to the user.

According to a yet further aspect of the present invention, there is provided a program for causing a computer to execute the steps of receiving an electronic program guide regarding a program through a communication network, determining a condition of each of programs based on data regarding the programs, preparing an electronic program guide of a modified display form wherein a selection section for performing a process in accordance with the condition of each of the programs is displayed, and transmitting the prepared electronic program guide toward the communication network.

With the program, a program guide to be used an the requesting party side can be prepared based on data regarding programs acquired through a network, and the thus prepared program guide can be transmitted.

According to a yet further aspect of the present invention, there is provided a program for causing a computer to execute the steps of receiving an electronic program guide through a communication network, displaying the received electronic program guide, and executing a program process in response to selection of one of the selection sections displayed on the electronic program guide.

With the program, conditions of programs can be grasped readily using a program guide acquired through a network, and the program guide can be used to perform such a program process as recording or playback.

The above and other objects, features and advantages of the present invention will become apparent from the following description and the appended claims, taken in conjunction with the accompanying drawings in which like parts or elements are denoted by like reference symbols.

BRIEF DESCRIPTION OF THE DRAWINGS

FIG. 4 is a schematic view showing an example of a display of an electronic program guide by the program management apparatus of FIG. 1;

DESCRIPTION OF THE PREFERRED EMBODIMENTS

Figure 1:
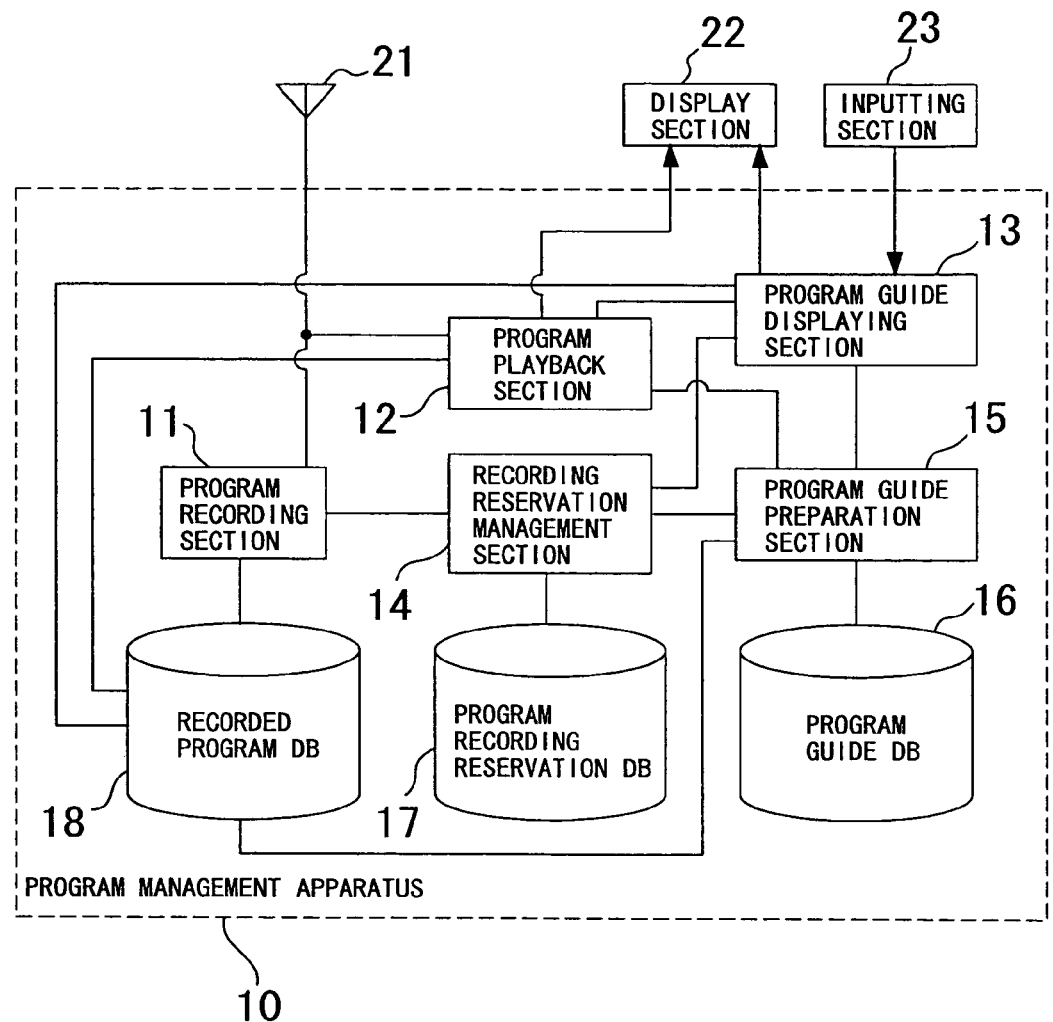
FIG. 1 is a block diagram showing an example of a configuration of a program management apparatus to which the present invention is applied.

Referring first to FIG. 1, there is shown an example of a configuration of a program management apparatus to which the present invention is applied. The program management apparatus shown is generally denoted by 10 and formed from, for example, a personal computer which has functions for performing recording and playback of a program, a video tape recorder (VTR) which has a function for acquiring an electronic program guide, or a like apparatus. The program management apparatus 10 includes a program recording section 11, a program playback section 12, a program guide displaying section 18, a recording reservation management section 14, and a program guide preparation section 15. The program management apparatus 10 further includes a program guide database (program guide DB) 16, a program recording reservation database (program recording reservation DB) 17, and a recorded program database (recorded program DB) 18.

It is to be noted that, while details are not described herein, the program management apparatus 10 of the present embodiment has environment (which signifies environment of hardware and software) wherein reception of a broadcast signal from a television station by radio or wire is possible. Further, the program management apparatus 10 has environment wherein an electronic program guide can be acquired from a broadcast signal or through the Internet.

The program recording section 11 performs a process for recording a program being broadcast into the recorded program database 18. The program playback section 12 performs a playback process of a program being broadcast by a broadcasting station or a program recorded in the recorded program database 18. If a playback process is performed by the program playback section 12, then the played back image is displayed on a display screen of a display section (for example, a display unit of a personal computer, a television apparatus or the like) 22, and, for example, sound corresponding to the played back image is outputted from a speaker not shown (for example, a speaker provided in a personal computer or a television apparatus). In the present program management apparatus 10, the program recording section 11 and the program playback section 12 include each a television tuner, and receive a television signal (which may be a television signal inputted by another means such as a cable), for example, from an antenna 21 for receiving a broadcasting wave, and perform recording and playback processes.

The program guide displaying section 13 performs a process for displaying a program guide based on program guide data prepared by the program guide preparation section 15 on the display screen of the display section 22. Further, the program guide displaying 13 instructs the program playback section 12 to execute a playback process or instructs the recording reservation management section 14 to perform recording reservation or program recording in accordance with an instruction generated by a user operating an inputting section 23 (for example, a remote controller, a keyboard or the like).

The recording reservation management section 14 issues a recording instruction to the program recording section 11 based on recording reservation information stored in the program recording reservation database 17. The program guide preparation section 15 prepares program guide data on which a present situation of a program is reflected based on data such as data stored in the program guide database 16, the program recording reservation database 17 and the recorded program database 18.

The program guide database 16, program recording reservation database 17 and recorded program database 18 include each a storage medium such as, for example, a hard disk.

Data relating to the electronic program guide are stored into the program guide database 16. Information relating to programs to be displayed on the program guide (information such as a program title and broadcasting time of each program) is acquired through a broadcast wave or the Internet and stored into the program guide database 16. In particular, for example, program information included in a broadcast wave or program information presented on a homepage held by a server connected to the Internet is acquired and stored into the program guide database 16 automatically (i.e., automatically in response to reception of a television signal) or in response to a predetermined operation by the user.

Recording reservation information of any program is stored into the program recording reservation database 17. The recording reservation information includes several kinds of information such as information for specifying starting time of recording (for example, a starting date and starting hour of recording), information for specifying ending time of recording (for example, an ending date and ending hour of recording or recording period from a recording starting date and hour) and information for specifying a broadcasting station of an object of recording (such as, for example, a broadcasting station name, a channel number or a preset channel number).

Recorded program information such as images, sound and program information of a recorded program (including a program being recorded) is stored into the recorded program database 18. The recorded program information includes, for each of programs, not only image information and sound information but also information for specifying starting time of recording, information for specifying ending time of recording, information for specifying a broadcasting station having broadcast a program, and information for managing a correspondence relationship between the image information and the sound information.

Figure 2:
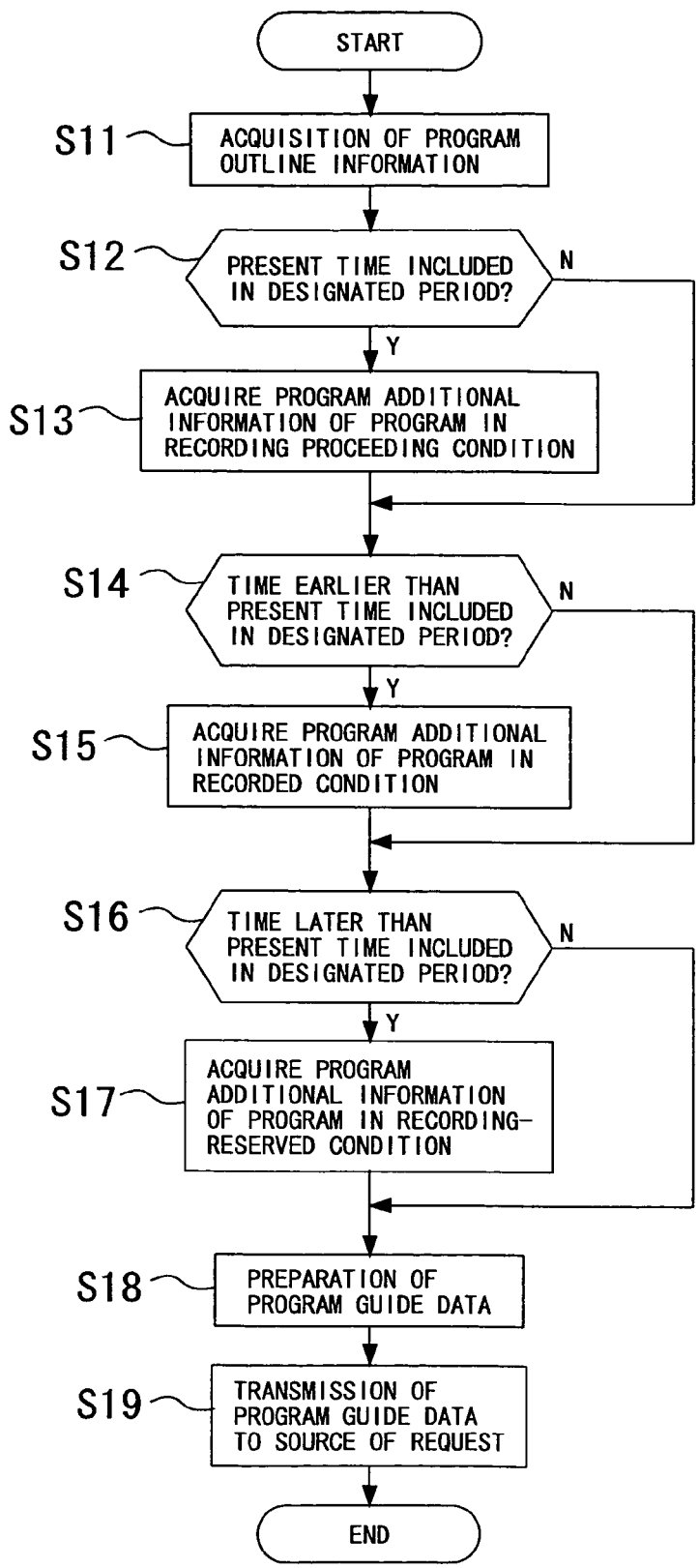
FIG. 2 is a flow chart illustrating an example of a program guide preparation process by the program management apparatus of FIG. 1.

A program guide preparation process by the program management apparatus 10 is described below. FIG. 2 illustrates an example of the program guide preparation process performed by the program guide preparation section 15 in the program management apparatus 10 of the present embodiment. Referring to FIG. 2, according to the program guide preparation process illustrated, the program guide preparation section 15 acquires, if the inputting section 23 is operated by the user to designate a period and a broadcasting station, program information conforming to the designation by the user (which may alternatively be program information distributed by a server on the Internet and stored in the program guide database 16 as a result of accessing to the Internet based on the designation by the user) from within the program information stored in the program guide database 16 (step S11). For example, if a starting date and hour, an ending date and hour and a channel number are designated by the user, then the program guide preparation section 16 acquires program outline information of programs which are to be broadcast by the designated channel after the designated starting date and hour till the ending date and hour (information such as, for example, for each program, a program is title, a broadcasting period, a broadcasting station from which the program is to be broadcast, and an outline of contents of the program).

After the program outline information is acquired, the program guide preparation section 15 confirms the present date and hour using a clock provided therein. Further, if the present time is included in the period designated by the user, then the program guide preparation section 15 acquires program additional information (information such as, for example, a broadcast starting date and hour and a broadcasting station of a program being recorded) relating to a program being recorded at present from the recording reservation management section 14 (steps S12 and S13).

Further, if a period earlier than the present time is included in the period designated by the user, then the program guide preparation section 15 confirms information stored in the recorded program database 18 and acquires program additional information (information such as, for example, a broadcasting starting date and hour and a broadcasting station of each of recorded programs) relating to recorded programs included in the period designated by the user from the recorded program database 18 (steps S14 and S15).

Further, if a period later than the present time is included in the period designated by the user, then the program guide preparation section 15 confirms stored information of the program recording reservation database 17 and acquires program additional information (information such as, for example, a broadcasting starting date and hour and a broadcasting station of a program reserved for recording) relating to recording-reserved programs included in the period designated by the user (steps S16 and S17).

Figure 3:
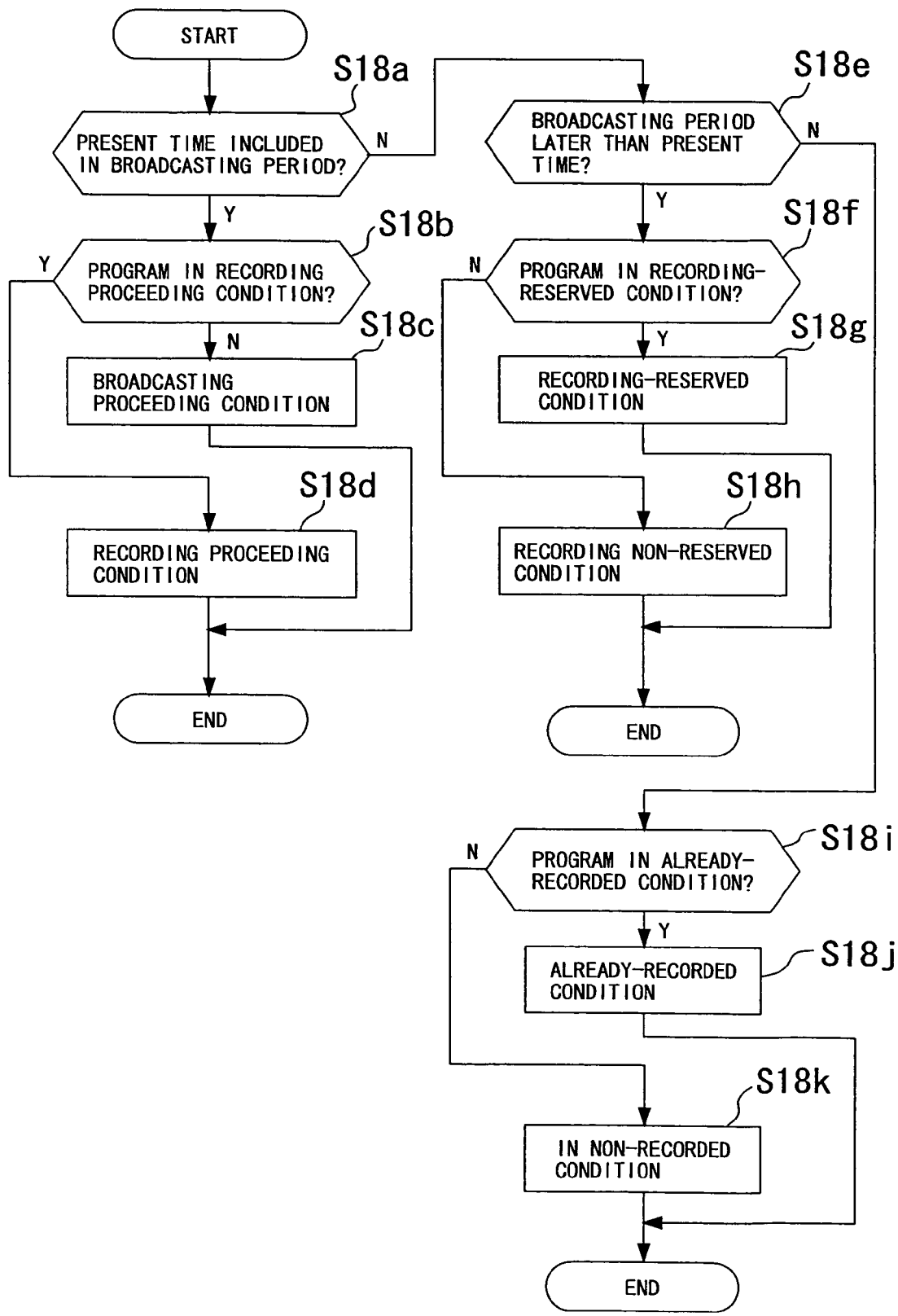
FIG. 3 is a flow chart illustrating an example of a program situation determination process by the program management apparatus of FIG. 1.

Thereafter, the program guide preparation section 15 prepares program guide data using the program outline information acquired in step S11 and the program additional information acquired in steps S13, S15 and S17 (step S18). FIG. 3 illustrates an example of a program situation determination process for determining a present situation of each of programs in the program guide data preparation process in step S18. It is to be noted that, the process illustrated in FIG. 3 is executed for each of programs displayed on the program guide.

Figure 8:
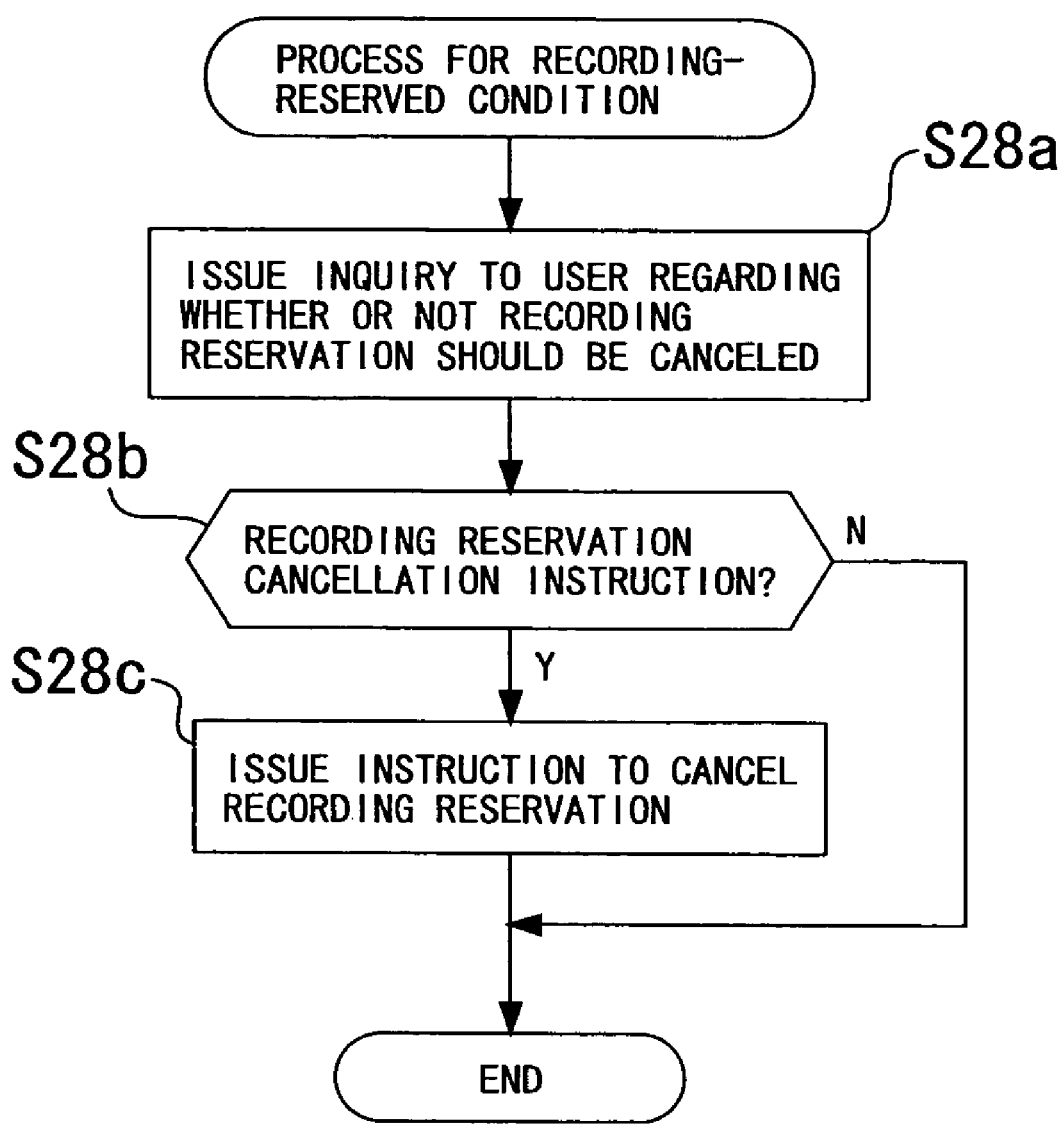
FIG. 8 is a flow chart illustrating an example of a process for a recording-reserved condition by the program management apparatus of FIG. 1.

Referring to FIG. 8, according to the program situation determination process illustrated, the program guide preparation section 15 determines, if the present time is included in a broadcasting period of a program which is an object of determination, that the program is a program "in a broadcasting proceeding condition" if it is not a program being recorded (steps S18a, S18b, S18c), but determines that the program is a program "in a recording proceeding condition" if it is a program being recorded (steps S18a, S18b, S18c). It is to be noted that the determination of whether or not the program is a program in a recording proceeding condition is performed depending upon whether or not the program which is an object of determination exists in the program additional information acquired in step S13. More particularly, the determination of whether or not the program which is an object of determination exists in the program additional information is performed depending upon whether or not a broadcasting station and broadcasting starting time of the program which is an object coincide with a broadcasting station and broadcasting starting time, respectively, of any program included in the program additional information (this similarly applies to the following description).

Further, the program guide preparation section 15 determines, if the broadcasting period is later than the present time (the broadcasting starting time is later than the present time), that the program is a program "in a recording-reserved condition" if it is a program reserved for recording (steps S18e, S18f and S18g), but determines that the program is a program "in a recording non-reserved condition" if it is not a program reserved for recording (steps S18e, S18f and S18h). It is to be noted that the determination of whether or not the program is a program reserved for recording is performed depending upon whether or not the program which is an object exists in the program additional information acquired from the program recording reservation database 17 in step S15.

Further, the program guide preparation section 15 determines, if the broadcasting period is not later than the present time (the broadcasting ending time is earlier than the present time), that the program is a program "in a recorded condition" if it is a recorded program (steps S18e, S18i and S18j), but determines that the program is a program "in a non-recorded condition" if it is not a recorded program (steps S18e, S18i and S18k). It is to be noted that the determination of whether or not the program is a program in a recorded condition is performed depending upon whether or not the program which is an object exists in the program additional information acquired from the recorded program database 18 in step S817.

FIG. 4 is a schematic view showing an example of a display of an electronic program guide displayed on the display section 22 based on program guide data prepared by the program guide preparation section 15. In the example shown, the electronic program guide displayed includes display places for broadcasting time which includes a period (for example, from 8:00 p.m. to 10:59 p.m.) designated by the user on the axis of ordinate, and display places for broadcasting stations (in FIG. 4, broadcasting stations A to D are indicated) designated by the user on the axis of abscissa. Program outline information and present situation information of a program are displayed in the pertaining place of the guide. The present situation information is displayed in such a manner that present situations (condition such as a recording-reserved condition or a recording proceeding condition) of each of programs can be identified.

While, in the example shown, the present situations of programs are displayed particularly like "recorded", they may be changed suitably for individual conditions such as, for example, a format of characters (color, kind of font, size of font, underline, shadow, void and so forth of a character to be displayed) of a title of a program to be displayed or the like, a background format of the display places (color and pattern of background), and kinds of icons to be displayed in a place for a program.

After the determination of present situations of programs to be displayed in the program guide is completed, the program guide preparation section 15 transmits the prepared program guide data to the program guide displaying section 13 of the source of the request (step S19). It is to be noted that the program guide preparation section 15 may otherwise store the prepared program guide data into the program guide database 16. After the program guide preparation section 15 transmits the program guide data, it ends the program guide preparation process here.

Figure 5:
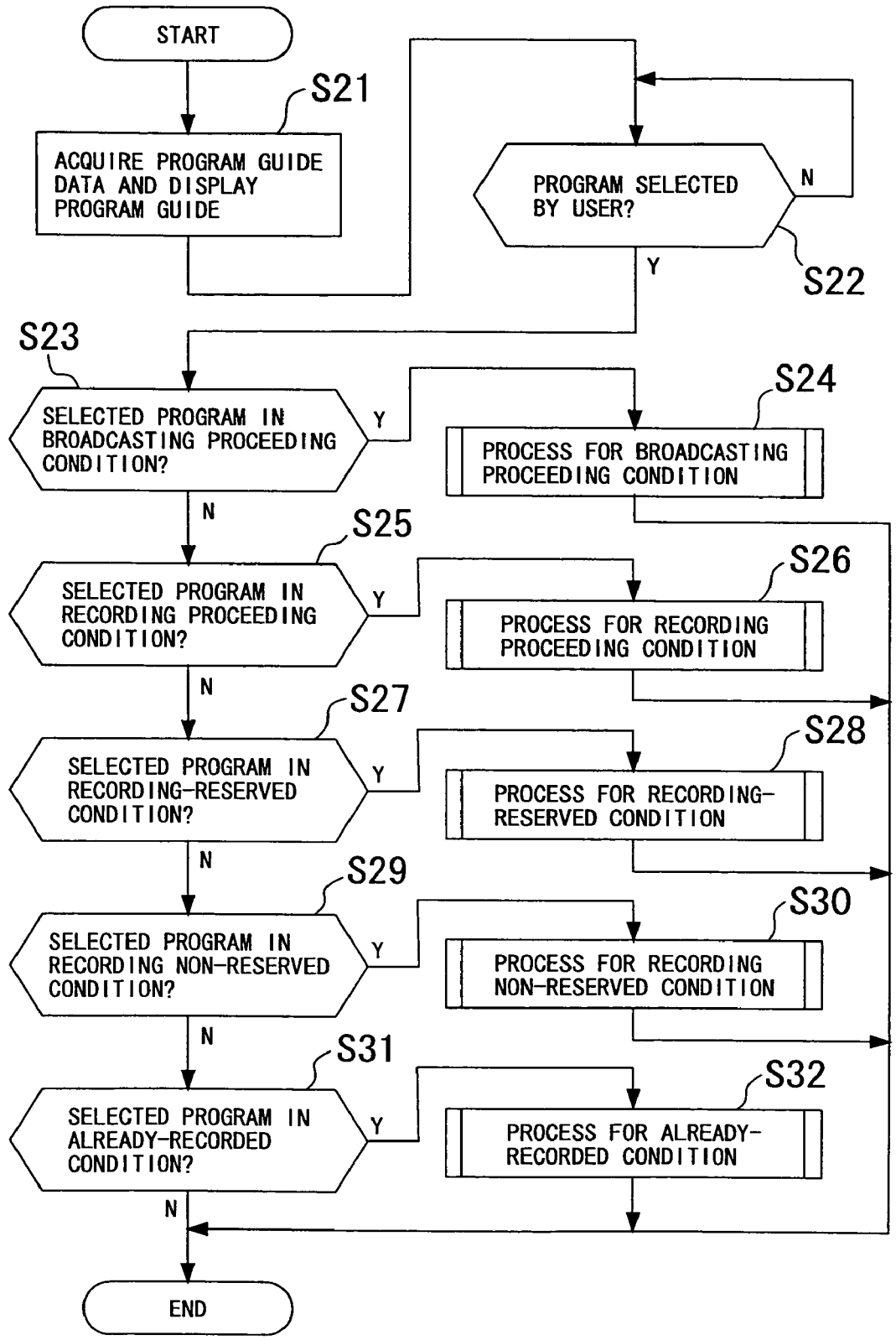
FIG. 5 is a flow chart illustrating an example of a program recording and playback process of the program management apparatus of FIG. 1.

Now, the program recording and playback process of the program management apparatus 10 is described. It is to be noted that the program recording and playback process includes not only recording or playback of a program but also various other program processes such as reservation of recording or cancellation of a recording reservation. FIG. 5 illustrates an example of the program recording and playback process to be executed by the program guide displaying section 13 of the program management apparatus 10. Referring to FIG. 5, according to the program recording and playback process illustrated, if a period and a broadcasting station are designated by the user, then the program guide displaying section 13 requests the program guide preparation section 15 to prepare program guide data conforming with the contents of the designation and acquires program guide data prepared by the program guide preparation section 15 in response to the request (refer to FIG. 3).

The program guide displaying section 13 displays, for example, such a program guide as shown in FIG. 4 on the display screen of the display section 22 based on the acquired program a guide data (step S21). The user will operate, for example, the inputting section 23 to select a program to be processed (such processing as enjoyment, recording, or reservation of recording) from among the programs displayed on the display guide (for example, such an inputting apparatus as a mouse may be operated to select a display location at which the desired program is to be displayed).

After a program is selected by the user (step S22), the program guide displaying section 13 specifies what operation can be executed in accordance with a present situation of the selected program (more particularly, contents of the present situation information) and executes a suitable process in response an instruction of the user.

For example, if the program selected by the user is in a broadcasting proceeding condition, then the program guide is displaying section 13 executes a process for a broadcasting proceeding condition (steps S23 and S24); if the program is in a recording proceeding condition, then the program guide displaying section 13 executes a recording proceeding process (steps S25 and S26); if the program is in a recording-reserved condition, then the program guide displaying section 13 executes a recording reservation completed process (steps S27 and S28); if the program is in a recording non-reserved condition, then the program guide displaying section 13 executes a recording non-reserved process (steps S29 and S30); or if the program is in a recorded condition, then the program guide displaying section 13 executes a recording completed process (steps S31 and S32). The determination of whether or not the program is in a recorded condition or the like is performed based on the present situation information (information obtained by the determination process of FIG. 3 described hereinabove) included in the electronic program guide data. It is to be noted the processes mentioned are hereinafter described individually. After the pertaining process is completed, the program guide displaying section 13 ends the program recording and playback process.

Figure 6:
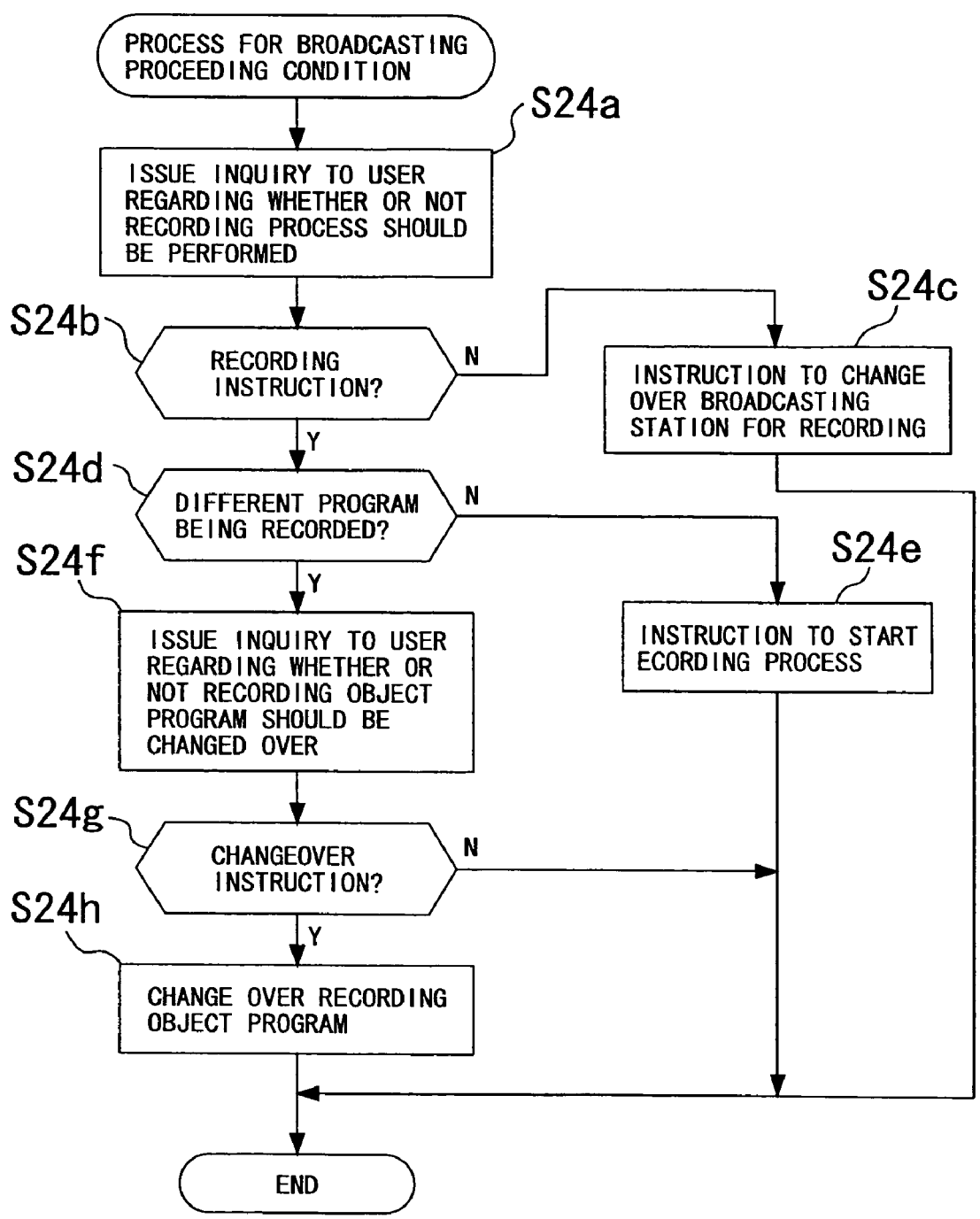
FIG. 6 is a flow chart illustrating an example of a process for a broadcasting proceeding condition by the program management apparatus of FIG. 1.

FIG. 6 illustrates an example of the process for a broadcasting proceeding condition in step S24 of FIG. 5. It is assumed here that the user selects the program C in step S22 described hereinabove. Referring to FIG. 6, in the broadcasting proceeding process illustrated, the program guide displaying section 13 issues an inquiry to the user regarding whether the program C should be recorded or enjoyed (step S24a). For example, the program guide displaying section 13 displays a selection region for "recording" and "enjoyment" on the display section 22 to make the enquiry. If one of the "recording" and the "enjoyment" displayed in the selection region is selected by the user through an operation of the inputting section 23, then the program guide displaying section 18 executes a process in accordance with the selection by the user.

If the user designates the enjoyment, then the program guide displaying section 13 issues an instruction designating the broadcasting station of the program C to the program playback section 12 to change over the broadcasting station (steps S24b and S24c). In accordance with the instruction, the program playback section 12 causes the display section 22 to display the program C. On the other hand, if the user designates the recording, then the program guide displaying section 13 issues an inquiry to the recording reservation management section 14 regarding whether or not a recording process is proceeding at present (and, if a recording process is proceeding, then the program guide displaying section 13 further issues an inquiry regarding whether or not the program being recorded is the program C) to confirm whether or not a recording process of some other program (a program other than the program C) is proceeding (steps S24b and S24d).

If a recording process is not proceeding, then the program guide displaying section 13 issues an instruction to the recording reservation management section 14 to record the program (step 24e). Consequently, the program recording section 11 starts recording of the program C in accordance with an instruction of the recording reservation management section 14. However, if a recording process is proceeding in step S24d, then the program guide displaying section 13 issues an inquiry to the user regarding whether or not the recording process which is currently proceeding should be ended to effect recording of the program C (step S24f).

Then, if the user determines that recording of the program C should be performed, then the program guide displaying section 13 issues an instruction to the program recording reservation database 17 to end the recording and further issues an instruction to the program recording reservation database 17 to record the program (steps S24g and S24h). Consequently, the program recording section 11 ends the recording processing which has been executed till then, and starts a recording process of the program C in accordance with an instruction from the program recording reservation database 17. On the other hand, if the user determines that recording of the program C should not be performed and the recording process which is currently proceeding should not be ended, then the program recording section 11 continues the recording process being currently executed.

It is to be noted that, if, in the broadcasting proceeding process described above, a recording instruction is issued from the user while recording is proceeding and an instruction to stop the recording being currently executed is not issued from the user, then a broadcasting station of the program designated by the user may be designated and displayed through the program playback section 12. In this instance, before the designated program is displayed, an inquiry may be issued regarding whether or not the program designated by the user should be enjoyed.

Figure 7:
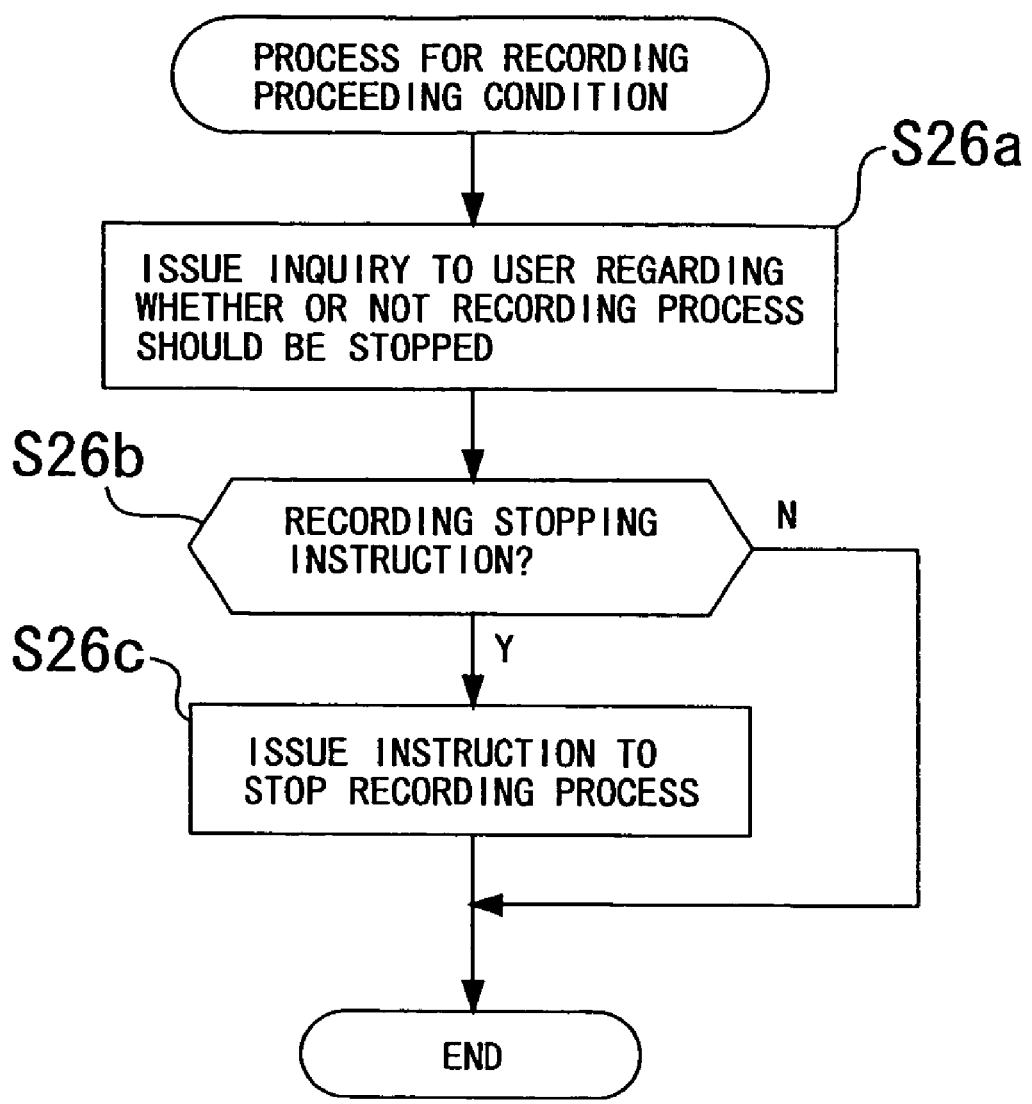
FIG. 7 is a flow chart illustrating an example of a process for a recording proceeding condition by the program management apparatus of FIG. 1.

FIG. 7 illustrates an example of the process for a recording proceeding condition in step S26 of FIG. 6. It is to be noted here that the user selects the program F in step S22 described above. Referring to FIG. 7, according to the recording proceeding process illustrated, the program guide displaying section 13 issues an inquiry to the user regarding whether or not recording of the program F should be stopped (step S26a). If the user issues an instruction to stop the recording of the program (Y in step S26b), then the program guide displaying section 18 issues an instruction to the program recording section 11 to stop the recording through the recording reservation management section 14 (step 26c). The program recording section 11 ends the recording process of the program B in accordance 10 with the instruction from the program guide displaying section 13.

However, if the user does not issue an instruction to stop the recording (N in step S26b), then the program guide displaying section 13 instructs the program recording section 11 to continue the recording process. However, if the user issues an instruction to end the recording process or the like, then the program guide displaying section 13 of the program management apparatus 10 ends the recording proceeding process here.

It is to be noted that, if, in the recording proceeding process described above, the user does not issue an instruction to stop the recording in response to the inquiry issued to the user regarding whether or not recording should be stopped, then an instruction to play back the program being currently recorded from the beginning may be issued to the program playback section 12. In such an instance, an instruction to display a designated program may be issued to the program playback section 12.

Where a plurality of processes which can be executed are available in this manner, the processes which can be selected may be presented in a place of the program guide for the programs. This can increase the number of processes which can be designated from within the program guide by the user, and the number of times by which an inquiry is issued can be decreased.

FIG. 8 illustrates an example of the process for a recording-reserved condition in step S28. It is assumed here that the program I is selected in step S22 described above by the user. Referring to FIG. 8, according to the reservation completion process illustrated, the program guide displaying section 13 issues an inquiry to the user regarding whether or not a recording reservation or the program I should be cancelled (step S28a). If a reservation canceling instruction is issued from the user, then the program guide displaying section 13 issues an instruction to the recording reservation management section 14 to cancel the recordation reservation of the designated program (steps S28b and S28c). The recording reservation management section 14 cancels the recording reservation of the program C in accordance with the recording reservation canceling instruction.

Figure 9:
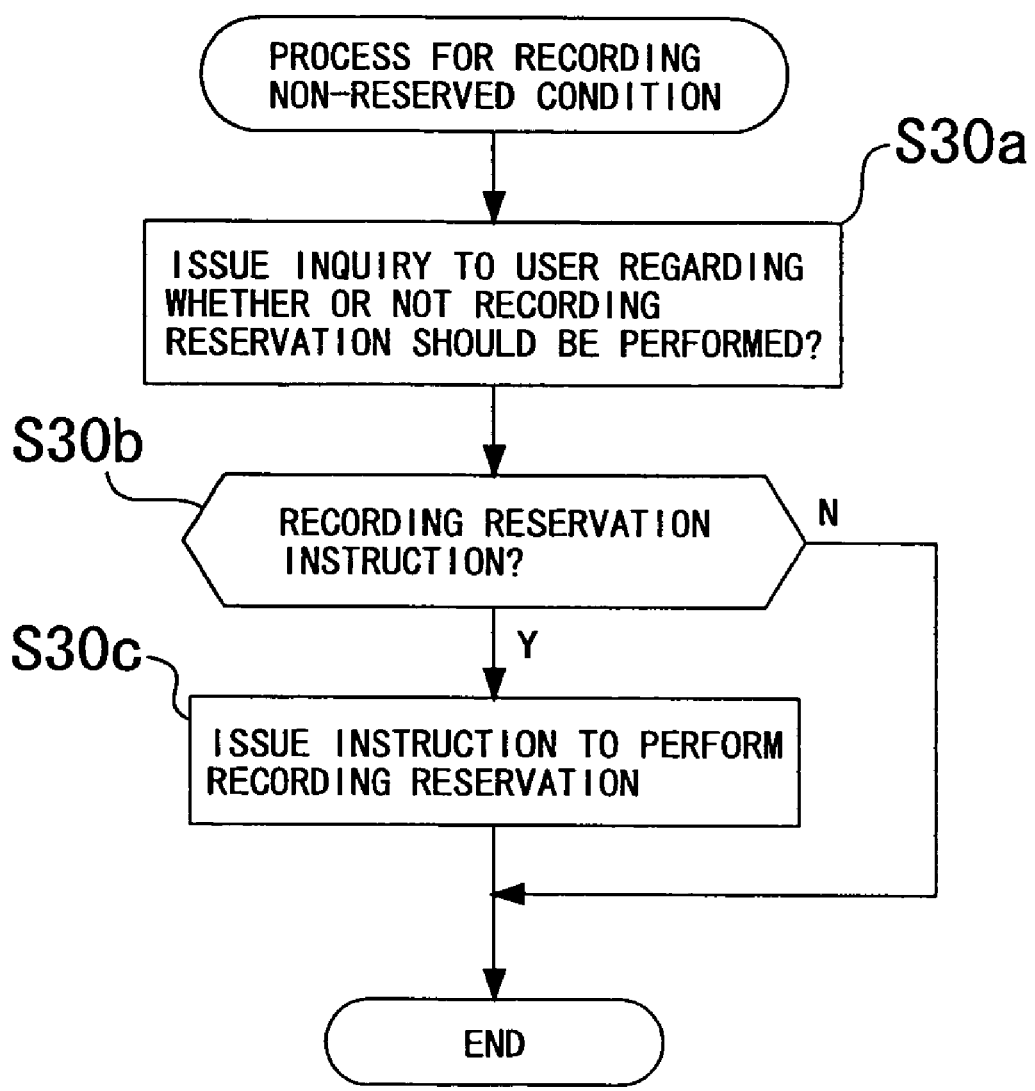
FIG. 9 is a flow chart illustrating an example of a process for a recording non-reserved condition by the program management apparatus of FIG. 1.

FIG. 9 illustrates an example of the process for a recording non-reserved condition in step S30. It is assumed here that the user selects the program D in step S22 described hereinabove. Referring to FIG. 9, according to the recording reservation non-completion process illustrated, the program guide displaying section 13 issues an inquiry to the user regarding whether or not reservation of recording of the program D should be performed (step S30a). If the user issues an instruction to perform such reservation of recording, then the program guide displaying section 13 instructs the recording reservation management section 14 to register the program D as a recording-reserved program into the program recording reservation database 17 (steps S30b and S30c). Upon reception of the instruction, the recording reservation management section 14 registers the program D as a recording-reserved program into the program recording reservation database 17.

Figure 10:
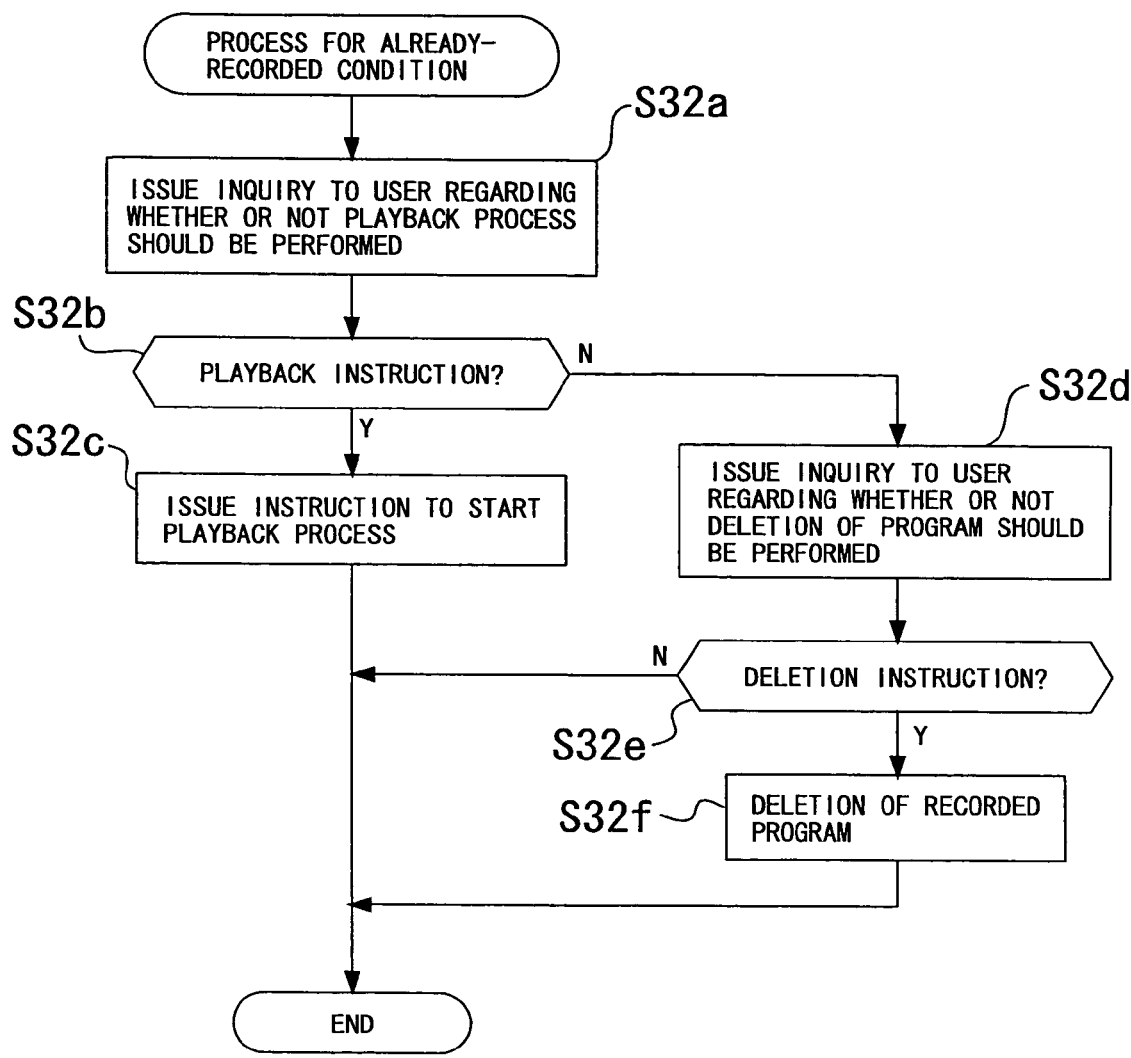
FIG. 10 is a flow chart illustrating an example of a process for an already-recorded condition by the program management apparatus of FIG. 1.

FIG. 10 illustrates an example of the process for an already-recorded condition in step S32. It is assumed here that the user selects the program A in step S22 described above. Referring to FIG. 10 according to the process for an already-recorded condition illustrated, the program guide displaying section 18 issues an inquiry to the user regarding whether or not the program A should be enjoyed (step S32a). If an instruction to enjoy the program A is issued from the user, then the program guide displaying section 13 instructs the program playback section 12 to play back the program A (steps S82b and S32c). The program playback section 12 starts a playback process of the program A in accordance with the playback instruction.

However, if an instruction not to enjoy the program A is issued from the user, then the program guide displaying section 18 issues an inquiry to the user regarding whether or not the program A should be deleted (erased) (step S32d). If an instruction to delete the program is issued from the user, then the program guide displaying section 13 deletes the program A stored in the recorded program database 18 (steps 32e and 32f).

As described above, since the program management apparatus 10 is configured such that a program guide which reflects a present situation of each program such as a situation that the program is in a recording-reserved condition or in an already-recorded condition and, when one of the programs displayed on the display guide is selected, various processes can be performed in accordance with the present situation of the selected program, the user can grasp conditions of the programs readily and can perform not only reservation of recording of a program but also cancellation of a reservation of recording, ending of recording of a program being recorded, recording or enjoyment of a program being broadcast or playback or deletion of a program recorded already.

Figure 11:
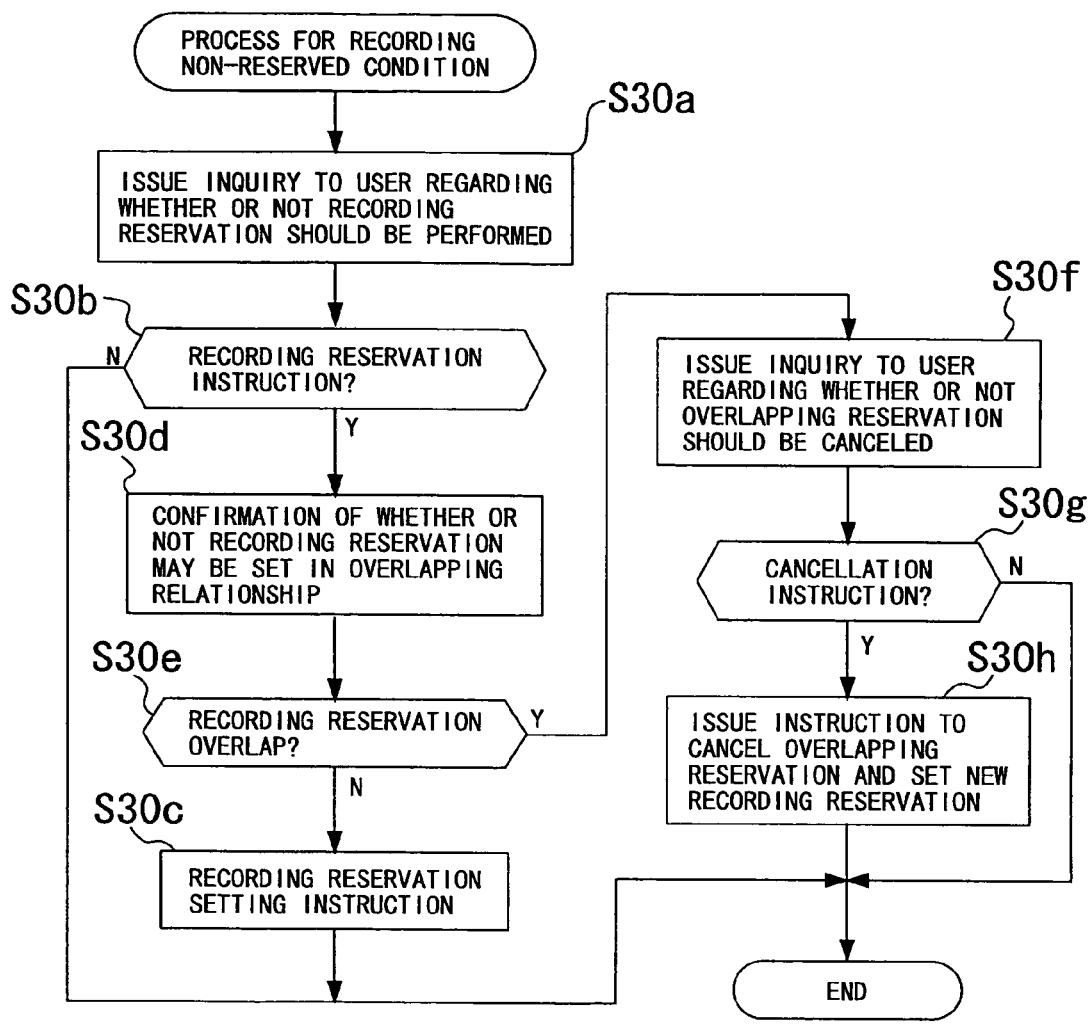
FIG. 11 is a flow chart illustrating another example of a process for a recording non-reserved condition by the program management apparatus of FIG. 1.

It is to be noted that, while, in the process for a recording non-reserved condition described above, if an instruction to perform recording reservation is issued from the user, then setting of a recording reservation is performed immediately, the process may include confirmation of whether or not the recording reservation may be set in an overlapping relationship with another recording reservation within the same period. FIG. 11 illustrates another example of the process for a recording non-reserved condition. It is assumed here that the user selects the program D in step S22 described above.

Referring to FIG. 11, according to the process for a recording non-reserved condition illustrated, the program guide displaying section 13 issues an inquiry to the user regarding whether or not recording reservation of the program D should be performed (step S30a). If an instruction to perform recording reservation is issued from the user, then the program guide displaying section 13 notifies the recording reservation management section 14 of a broadcasting period of the program D to acquire recording reservation information and confirms whether or not the program D is reserved for recording in an overlapping relationship within the same period (step S30b). If some other program to be broadcast within the broadcasting period of the program D is not reserved for recording as yet, then the program guide displaying section 13 issues an instruction to the recording reservation management section 14 to register the program D as a recording-reserved program into the program recording reservation database 17 (steps S30e and S30c).

If some other program to be broadcast within the broadcasting period of the program D is reserved already for recording, then the program guide displaying section 13 issues an inquiry to the user regarding whether or not the recording reservation existing already should be deleted (step S30f). If a cancellation instruction is issued from the user, then the program guide displaying section 13 issues an instruction to the recording reservation management section 14 to cancel the reservation of the program reserved for recording and issues an instruction to the recording reservation management section 14 to register the program D into the program recording reservation database 17 (steps S30g and S30h).

If the process for a recording non-reserved condition is performed in such a manner as described just above, then it can be prevented that two or more recording reservations are made in an overlapping relationship within the same period in error. It is to be noted that, if the program management apparatus 10 is configured such that two programs can be recorded simultaneously, then when a setting request for recording reservation which designates recording of three of more programs within the same period is issued, an inquiry regarding which one of the recording reservations should be cancelled may be issued to the user.

Figure 12:
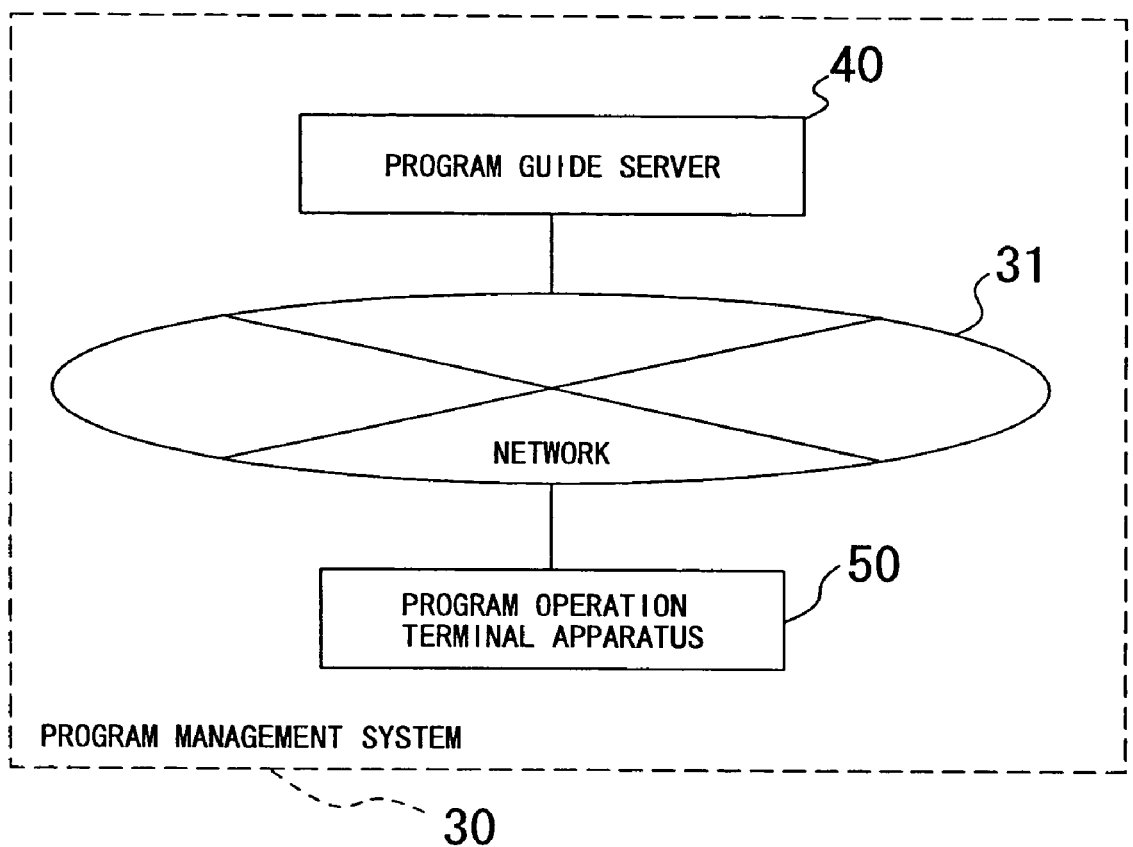
FIG. 12 is a block diagram showing an example of a configuration of a program management system to which the present invention is applied.

Now, a program management system to which the present invention is applied is described with reference to FIG. 12. Referring to FIG. 12, the program management system shown is generally denoted at 30 and includes a program guide server 40 and a program operation terminal apparatus 50. The program guide server 40 and the program operation terminal apparatus 50 are connected to each other by a network 31 such as, for example, the Internet. It is to be noted that any number of such program operation terminal apparatus 50 may be connected to the network 31.

Figure 13:
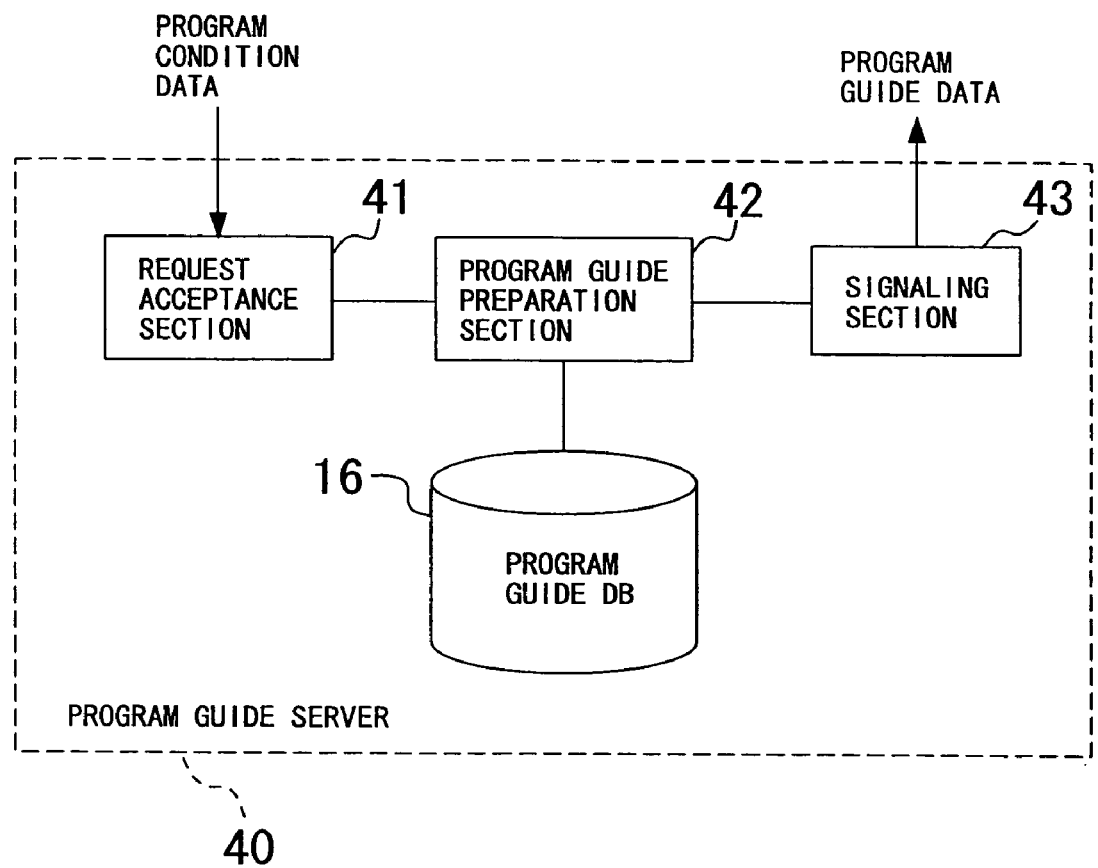
FIG. 13 is a block diagram showing an example of a configuration of a program guide server of the program management system of FIG. 12.

FIG. 13 shows a configuration of the program guide server 40. Referring to FIG. 13, the program guide server 40 shown includes a program guide database 16 in which program guide data from which an electronic program guide is to be prepared are stored, a request acceptance section 41, a program guide preparation section 42, and a signaling section 43. The program guide server 40 is formed from an information processing apparatus such as, for example, a workstation or a server and has functions as a WWW server. Further the program guide server 40 has a function of transmitting program guide data to the program operation terminal apparatus 50.

The request acceptance section 41 performs a reception process of a request for signaling of program guide data from the program operation terminal apparatus 50 and a reception process of recorded information data from the program operation terminal apparatus 50.

The program guide preparation section 42 performs a process of preparing program guide data for a designated period based on data stored in the request acceptance section 41 and recorded information data received by the request acceptance section 41.

The signaling section 43 performs a process of transmitting program guide data prepared by the program guide preparation section 42 toward the program operation terminal apparatus 50.

Figure 14:
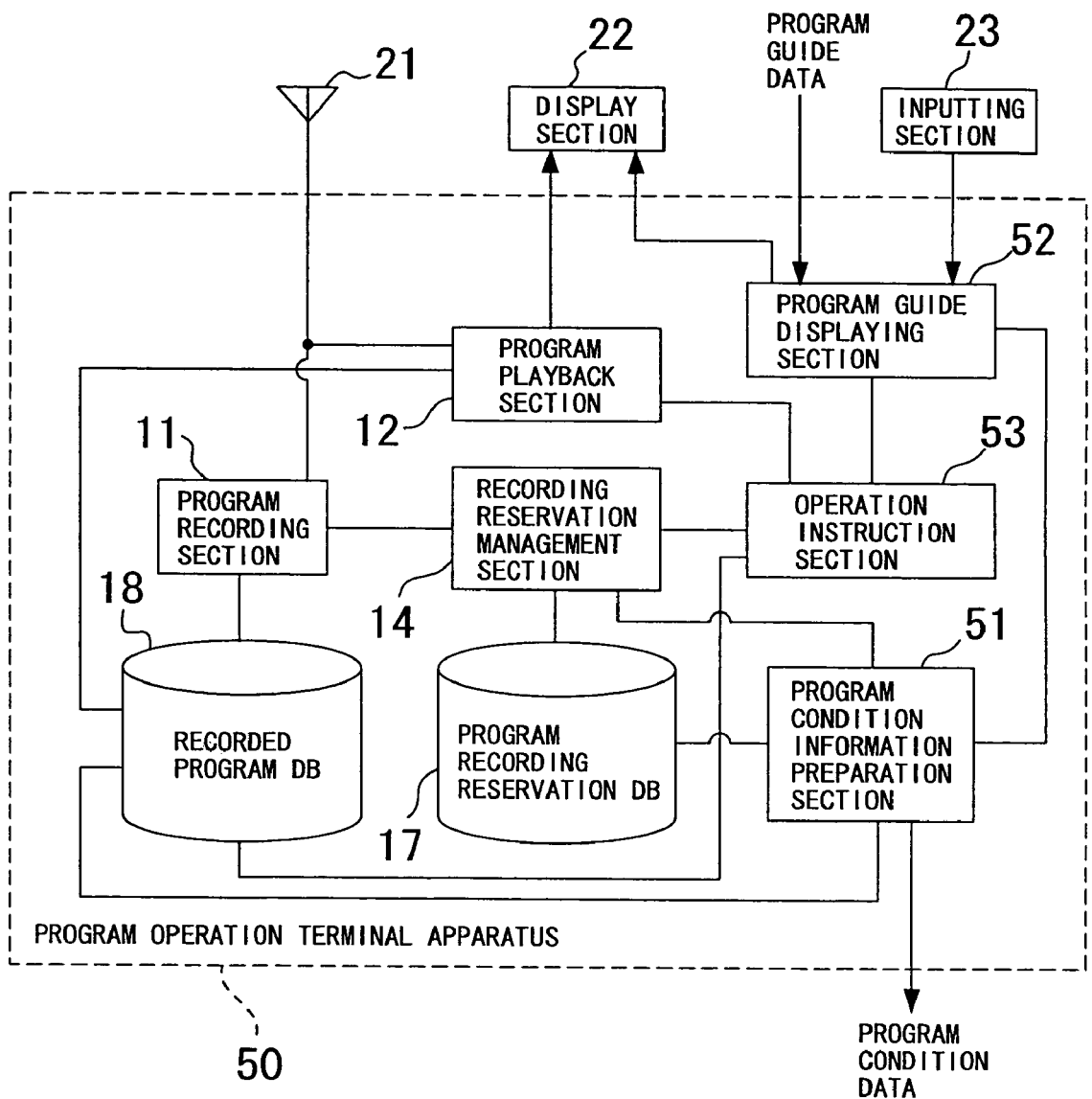
FIG. 14 is a block diagram showing an example of a configuration of a program operation terminal apparatus of the program management system of FIG. 12.

FIG. 14 shows an example of a configuration of the program operation terminal apparatus 50. The program operation terminal apparatus 50 is formed from, for example, a personal computer having functions of performing recording and playback of a program or a video tape recorder having environment for connection to the network 31.

The program operation terminal apparatus 50 includes a program recording section 11, a program playback section 12, a recording reservation management section 14, a program recording reservation database 17, a recorded program database 18, a program condition information preparation section 51, a program guide displaying section 52, and an operation instruction section 53. The program operation terminal apparatus 50 has various functions including a function of transmitting program condition data, which is hereinafter described, to the program guide server 40 and a function of acquiring program guide data, on which a recording condition is reflected, from the program guide server 40 through the network 31. The program operation terminal apparatus 50 further has a function of browsing a homepage on the network 31 using a browser incorporated therein.

The program condition information preparation section 51 performs a process of preparing program condition data based on program guide data acquired from the program guide server 40, recording reservation information stored in the program recording reservation database 17, recorded program information stored in the recorded program database 18 and information acquired from the recording reservation management section 14 and signaling a request for signaling of a program guide and program condition data toward the program guide server 40.

The program condition data include a plurality of individual program condition data corresponding to programs reserved for recording, recorded already or being recorded. Each of the individual program condition data includes data representative of a present situation of a program (situation such as a recording-reserved situation, an already-recorded situation or a recording proceeding situation) (a value representative of a recording-reserved condition, an already-recorded condition or a recording proceeding condition) a broadcasting station of the program (a broadcasting station from which a program is distributed irrespective of whether the program is not broadcast already, has been broadcast already or is being broadcast) (a value representative of the broadcasting station of the program) and data representative of broadcasting starting time of the program (a broadcasting date and broadcasting starting hour of the program). It is to be noted that the data representative of a broadcasting station may be, for example, a broadcasting station name or a channel number.

The program guide displaying section 52 performs a process of issuing an instruction to the program condition information preparation section 51 to signal a request for signaling of program guide data and displaying program guide data received from the program guide server 40. The program guide displaying section 52 includes a browser and has a function of causing the display section 22 to display a page described in the HTML (Hyper Text Markup Language) or the XML (Extensible Markup Language).

The operation instruction section 53 issues an operation instruction to the program playback section 12, recording reservation management section 14 or recorded program database 18 based on contents of operation instruction data included in program guide data sent from the program guide server 40 to the program operation terminal apparatus 50.

The program table data sent from the program guide server 40 to the program operation terminal apparatus 50 are described, for example, in the HTML, the XML or the like and have operation instruction data embedded therein, for example, for causing the operation instruction section 53 to issue an operation instruction based on selection of a program by the program playback section 12.

The operation instruction is realized by describing a hyperlink for reading out data associated with the operation instruction section 53 from the program guide server 40. Data sent from the program guide server 40 in response to designation of a hyperlink include identification information of a broadcasting station (broadcasting station name, channel number, frequency call sign or the like), recording starting time, a recording period, and a type of an operation. By the operation instruction data, identification information of a broadcasting station (broadcasting station name, channel number, frequency call sign or the like), recording starting time, a recording period, and a type of an operation are passed to the operation instruction section 53.

It is to be noted that such a program language as the Java, JavaScript or VBScript may be used to embed, for example, a file (operation instruction data), which describes an instruction to send an operation instruction from the program playback section 12 to the operation instruction section 53, in an HTML file (program guide data).

Figure 15:
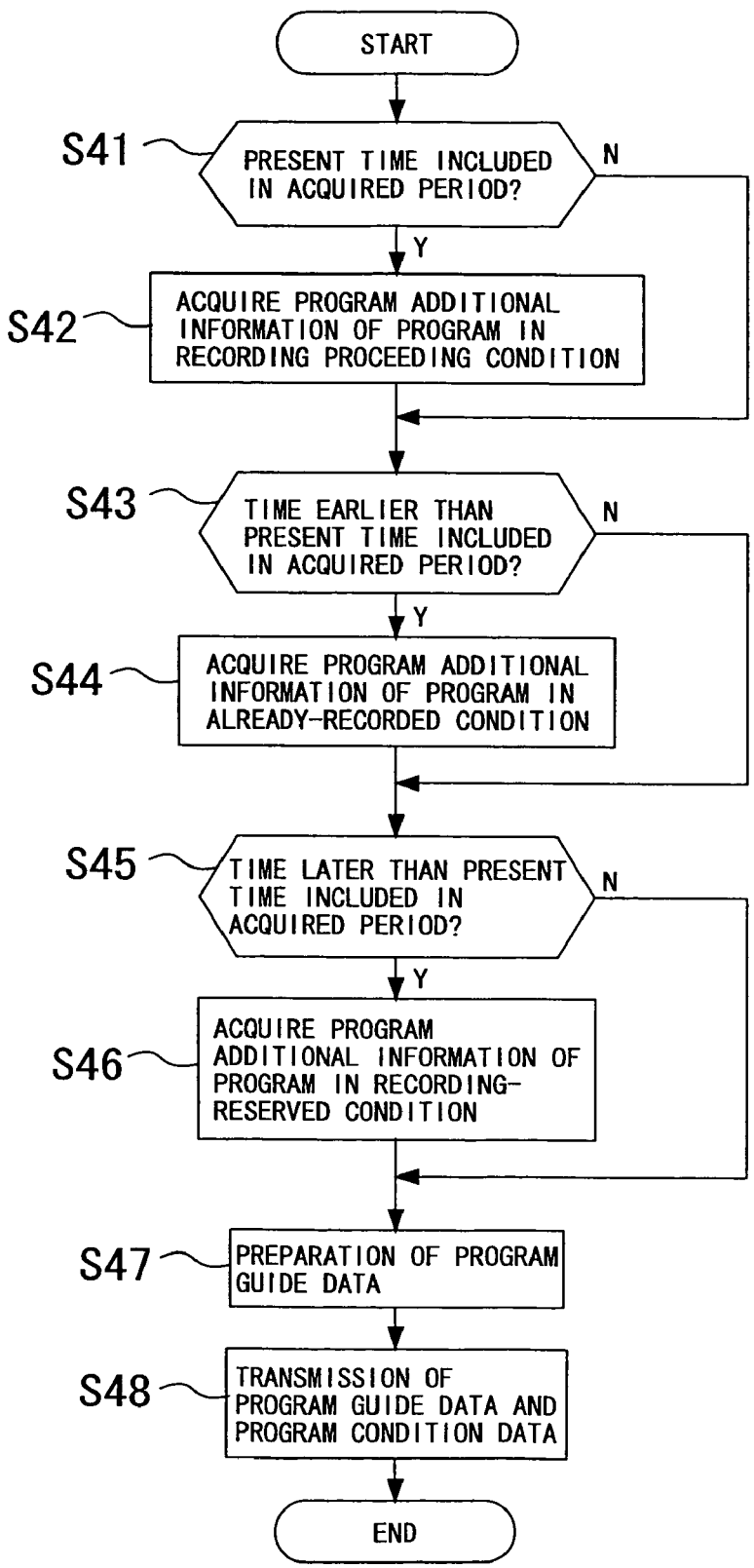
FIG. 15 is a flow chart illustrating an example of a program condition information preparation process by the program operation terminal apparatus of FIG. 14.

Now, a program condition information preparation process of the program condition information preparation section 51 of the program management system 30 is described. FIG. 15 illustrates an example of the program condition information preparation process. The program condition information preparation section 51 starts the program condition information preparation process in response to an acquisition requesting instruction of program guide data from the program guide displaying section 52. The program guide displaying section 52 instructs, in accordance with an instruction from the user, the program condition information preparation section 51 to issue a request for acquisition of program guide data for displaying a program guide of broadcasting stations within a period designated by the user. It is to be noted that, when program guide data are received from the program guide server 40 in response to an acquisition request from the program condition information preparation section 51, the program guide displaying section 52 displays a program guide based on the program guide data on the display section 22.

Referring to FIG. 15, according to the program condition information preparation process illustrated, the program condition information preparation section 51 confirms a date and hour at present based on a clock incorporated therein. Then, if the present time is included in an acquisition period of program guide data (period of a program guide to be acquired), then the program condition information preparation section 51 acquires program additional information relating to the program being currently recorded from the recording reservation management section 14 (steps S41 and S42). On the other hand, if a period earlier than the present time is included in the acquisition period of program guide data, then the program condition information preparation section 51 confirms the stored information of the recorded program database 18 and acquires program additional information relating to recorded programs included in the acquisition period of the program guide data from the recorded program database 18 (steps S43 and S44). Further, if a period later than the present time is included in the acquisition period of the program guide data, then the program condition information preparation section 51 confirms the stored information of the program recording reservation database 17 and acquires program additional information relating to programs reserved for recording included in the acquisition period of the program guide data from the program recording reservation database 17 (steps S45 and S46).

Then, the program condition information preparation section 51 prepares program condition data using the information regarding the acquisition period of the program guide data and the program additional information acquired in steps S42, S44 and S46 (step S47). Then, the program condition information preparation section 51 transmits the thus prepared program condition data and a program guide acquisition request including the acquisition period of the program guide data to the program guide server 40 through the network 31 to request the program guide server 40 for acquisition of program guide data.

Figure 16:
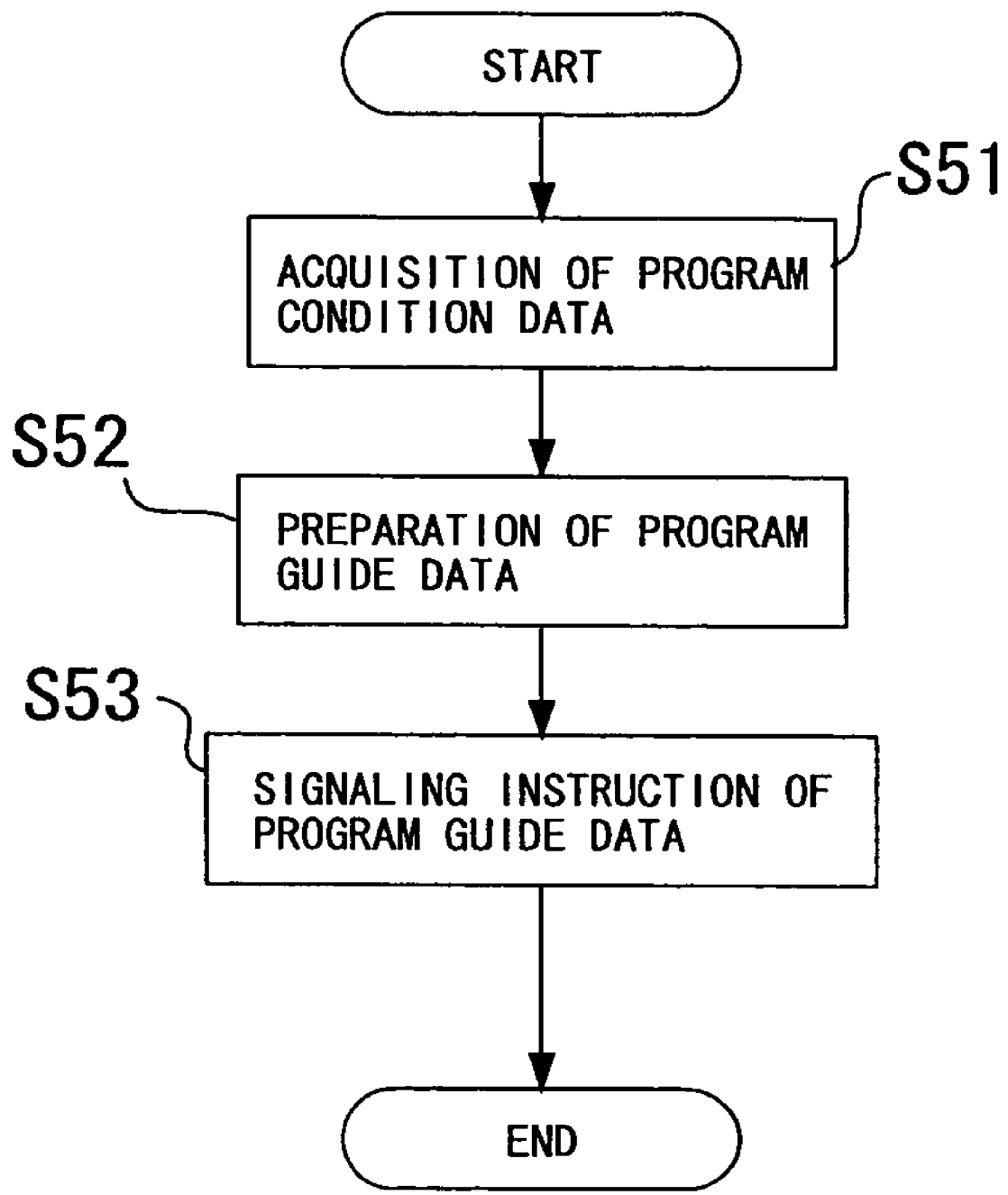
FIG. 16 is a flow chart illustrating an example of a program guide data preparation process by the program guide server of FIG. 13.

Now, a program guide data preparation process of the program management system 30 is described. FIG. 16 illustrates an example of the program guide data preparation process executed by the program guide server 40. Referring to FIG. 16, according to the program guide data preparation process illustrated, the request acceptance section 41 of the program guide server 40 acquires a program guide acquisition request and program condition data sent thereto from the program operation terminal apparatus 50 as a result of execution of the process of FIG. 15 (step S51).

After the program guide acquisition request is acquired, the request acceptance section 41 transmits the acquired program guide acquisition request and program condition data to the program guide preparation section 42 and instructs the program guide preparation section 42 to prepare program guide data for the period designated in the program guide acquisition request. The program guide preparation section 42 acquires program information within the designated period from the program guide database 16 in accordance with the instruction from the request acceptance section 41 and determines present situations of the individual programs based on program condition data sent thereto with regard to the individual programs to prepare program guide data (step S52).

Figure 17:
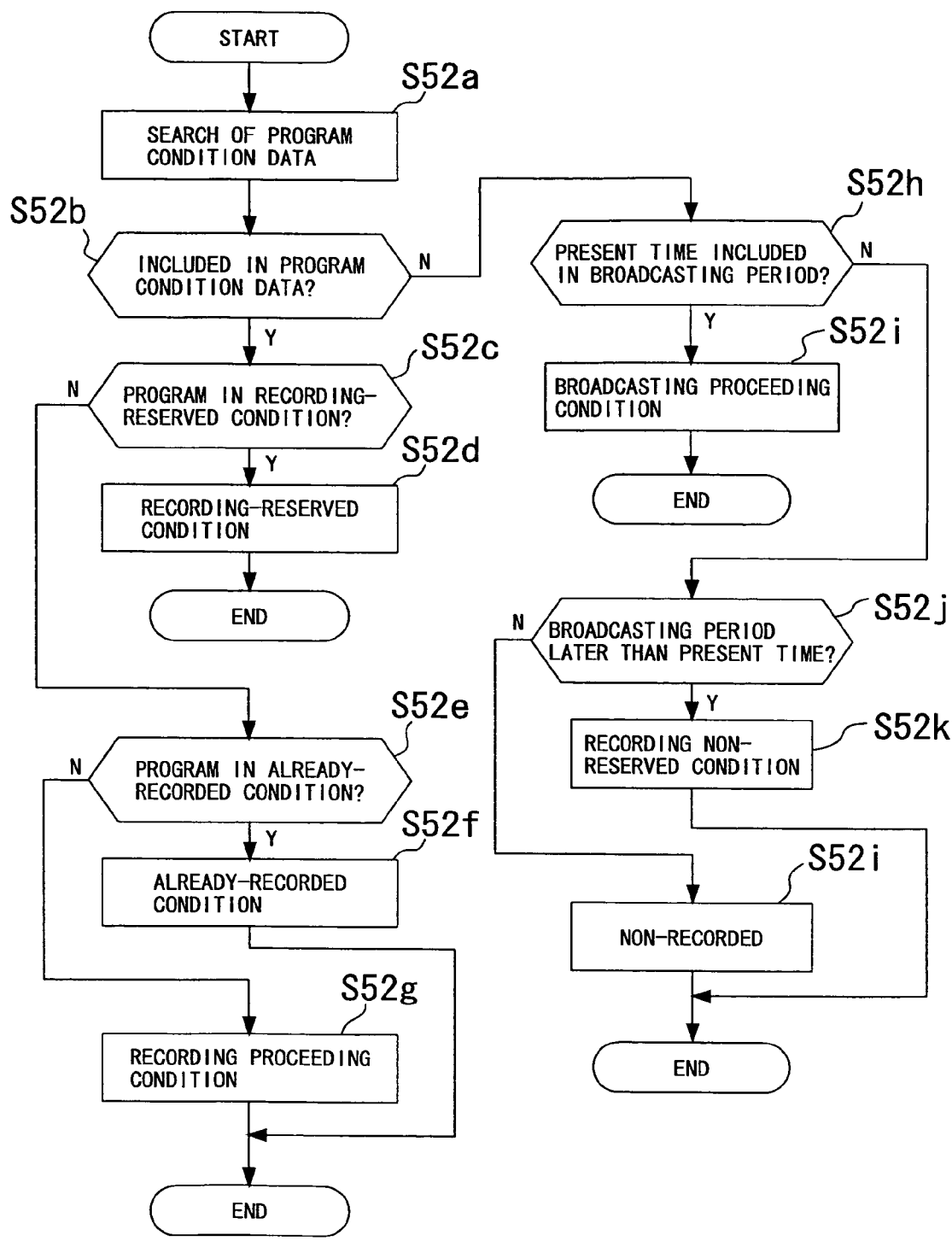
FIG. 17 is a flowchart illustrating an example of a program situation determination process by the program guide server of FIG. 13.

FIG. 17 illustrates an example of a program situation determination process for determining a present situation of each program in the process of preparation of program guide data in step S52. It is to be noted that the process illustrated in FIG. 17 is executed for each of the programs to be displayed on the display guide.

Referring to FIG. 17, according to the program situation determination process illustrated, the program guide preparation section 42 first searches the acquired program condition data in order to use them for determination of a present situation of an object program (step S52$a$). If the object program is included in the acquired program condition data, then if the object program is reserved for recording already, then the program guide preparation section 42 determines that the program is "in a recording-reserved condition" (steps S52$b$, S52$c$ and S52$d$). However, if the object program is not reserved for recording as yet, then if it is recorded already, then the program guide preparation section 42 determines that the program is "in an already-recorded condition" (steps S52$e$ and S52$f$), but if it is not recorded already, then the program guide preparation section 42 determines that the program is "in a recording proceeding condition" (steps S52$e$ and S52$g$).

It is to be noted that whether the object program is included in the program condition data is determined depending upon whether or not the broadcasting station and the broadcasting starting time included in any of the programs included in the program condition data coincide with the broadcasting station and the broadcasting starting time of the object program respectively (this similarly applies to the description given below). Then, the determinations of whether or not the program is a program in a recording-reserved condition and whether or not the program is in an already-recorded condition are based on the program condition data of the program which exhibits coincidence with the object program.

If the object program is not included in the acquired program condition data, then the program guide preparation section 42 determines that, if the present time is included in the broadcasting period of the object program, the program is "in a broadcasting proceeding condition" (steps S52$b$, S52$h$ and S52$i$). However, if the present time is not included in the broadcasting period of the object program, then the program guide preparation section 42 confirms whether or not the broadcasting period of the object program is later than the present time (whether or not the broadcasting starting time is later than the present time) (steps S52$h$ and S52$i$).

Then, if the broadcasting period is later than the present time, then the program guide preparation section 42 determines that the program is "in a recording non-reserved condition" (steps S52*j* and S52*k*). On the other hand, if the broadcasting period is earlier than the present time (if the broadcasting ending time is earlier than the present time), then the program guide preparation section 42 determines that the program is "in a non-recorded condition" (steps S52*j* and S52*l*).

It is to be noted that the program guide preparation section 42 prepares, based on the determination result described above, program guide data so that operation buttons for performing various operations in accordance with a present situation of each program can be displayed on a program guide. More particularly, for example, no operation button is displayed for a program in a non-recorded condition while a "reservation button" is displayed for a program in a recording non-reserved condition and a "recording reservation cancellation button" is displayed for a program in a recording-reserved condition. Further, an "enjoyed program changeover/recording start button" is displayed for a program in a broadcasting proceeding program; a "playback starting/recording ending button" is displayed for a program in a recording proceeding condition; and a "playback starting/program deletion button" is displayed for a program in an already-recorded condition.

It is to be noted that, where the present situation of a program is one of "a broadcast proceeding situation", "a recording proceeding situation" and "an already-recorded situation", two operations are available, and an operation button may be provided for each of the operations. For example, such operation buttons are provided in a display space for each program in the program guide shown in FIG. 4. The user can perform various program operations by depressing the operation buttons using an inputting apparatus such as a mouse.

After program guide data are prepared, the program guide preparation section 42 issues an instruction to the signaling section 43 to send the prepared program guide data to the program operation terminal apparatus 50 from which the request has been issued. In response to the instruction, the signaling section 43 signals the designated program guide data to the designated program operation terminal apparatus 50 (step S53).

When the program guide data prepared by the program guide server 40 are received, the program guide displaying section 52 of the program operation terminal apparatus 50 displays a program guide based on the acquired program guide data on the display section 22. On the displayed program guide, for example, various operation buttons are displayed in accordance with present situations of the individual programs. If the user depresses one of the operation buttons on the displayed program guide, then the program guide displaying section 52 transmits predetermined operation instruction data included in the program guide data to the operation instruction section 53 in response to the depression of the operation button. Consequently, the operation instruction section 53 is started up and issues various instructions to pertaining sections to execute suitable processes in accordance with the depressed button.

Now, processing of the operation instruction section 53 is described. The operation instruction section 53 is started up after identification data of a broadcasting station, recording starting time, a recording period and a kind of an operation are designated. After the operation instruction section 53 is started up, it performs its processing based on the type of the designated operation. In the following, the processing of the operation instruction section 53 is described for each designated operation.

Figure 18:
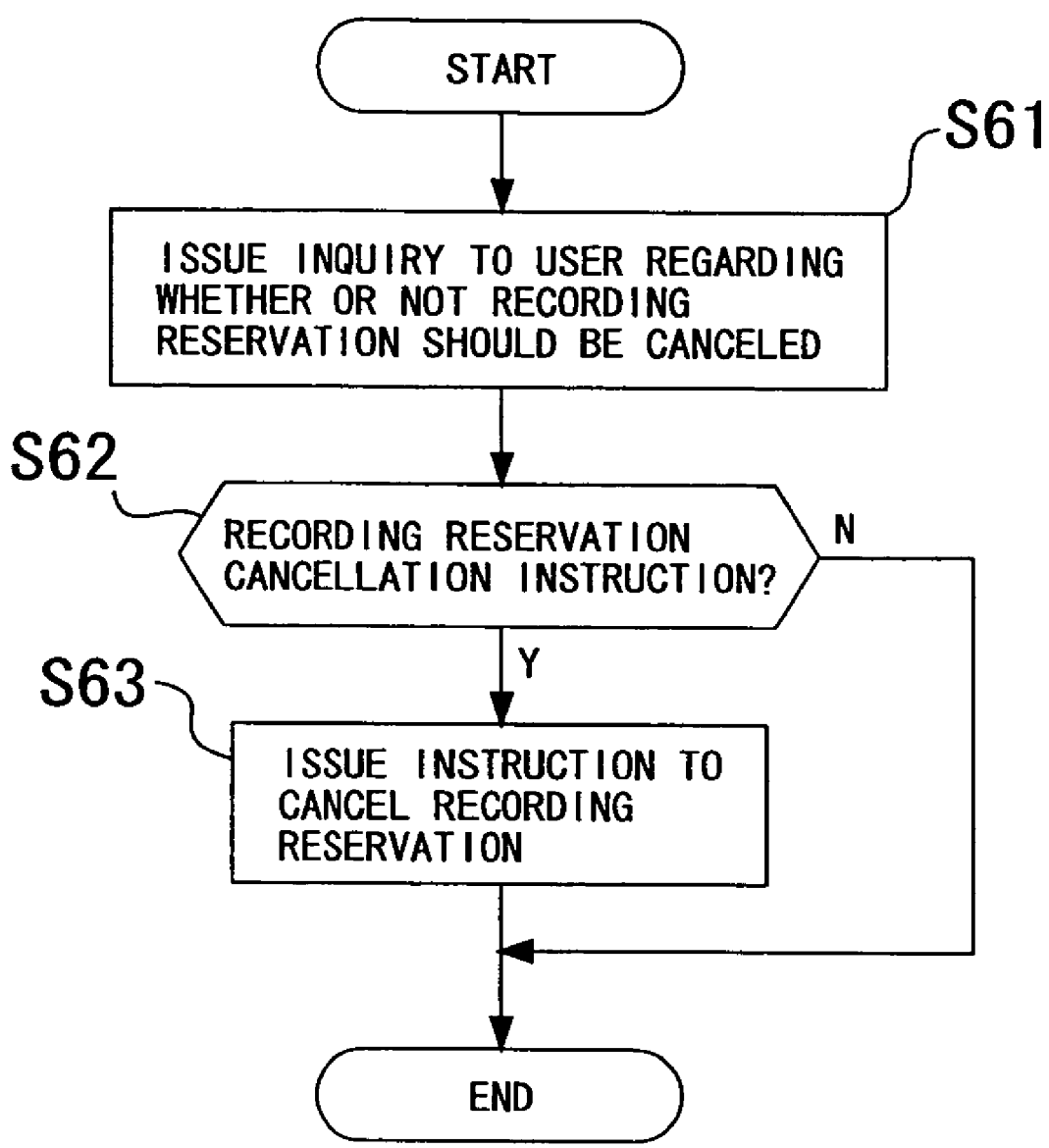
FIG. 18 is a flow chart illustrating an example of a recording reservation cancellation process by the program operation terminal apparatus of FIG. 14.

FIG. 18 illustrates an example of a recording reservation cancellation process when the recording reservation cancellation button is depressed by the user. It is assumed here that the user depresses the "recording reservation cancellation button" provided, for example, for the program X displayed on the display guide. Referring to FIG. 18, when the "recording reservation cancellation button" is depressed, the program guide displaying section 52 issues an inquiry to the user regarding whether or not the recording reservation of the program X should be cancelled (step S61). If an instruction to cancel the reservation is issued from the user, then the operation instruction section 53 issues an instruction to the recording reservation management section 14 to cancel the recording reservation of the designated program (steps S62 and S63). The recording reservation management section 14 receives the instruction from the operation instruction section 53 and cancels the recording reservation of the program X in accordance with the recording reservation cancellation instruction.

It is to be noted that, when the recording reservation cancellation button" is depressed, a recording reservation cancellation instruction may be issued immediately without issuing an inquiry to the user regarding whether or not the recording reservation should be cancelled.

Figure 19:
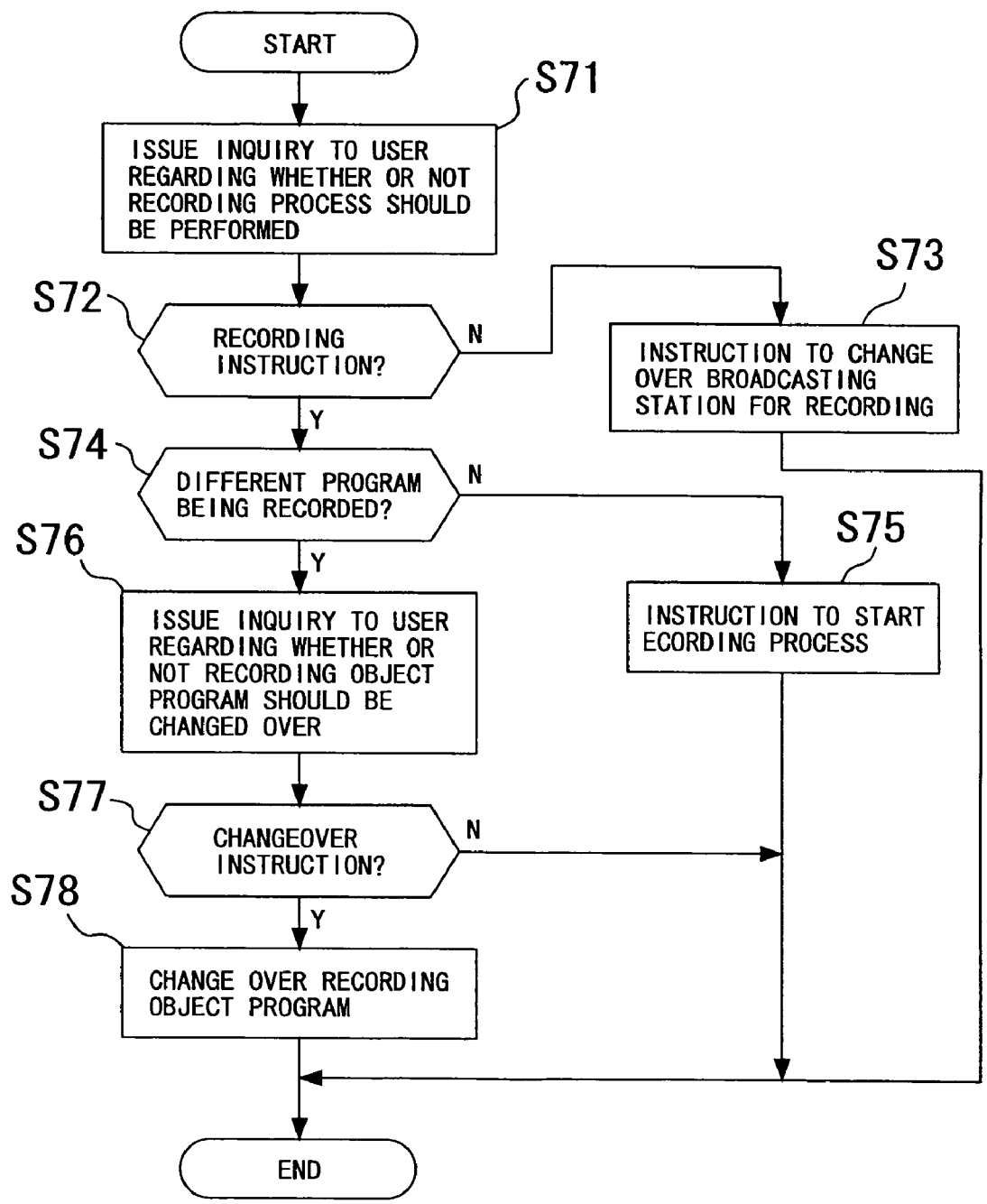
FIG. 19 is a flowchart illustrating an example of a program enjoyment and recording process by the program operation terminal apparatus of FIG. 14.

FIG. 19 illustrates example of a program enjoyment and recording process when the enjoyed program changeover/recording starting button is depressed by the user. It is assumed here that the user depresses the "enjoyed program changeover/recording starting button" provided, for example, for the program Y displayed on the program guide. When the "enjoyed program changeover/recording starting button" is depressed, the program guide displaying section 52 issues an inquiry to the user regarding whether the program Y should be recorded or enjoyed (step S71). For example, the program guide displaying section 52 causes the display section 22 to display a selection region for "recording" and "enjoyment" to make the inquiry. If one of "recording" and "enjoyment" displayed in the selection region is elected by an operation of the inputting section 23 by the user, then the program guide displaying section 52 issues an instruction corresponding to the selected content E by the user to the operation instruction section 53.

If the instruction of the user is the enjoyment, then the operation instruction section 53 issues an instruction to the program playback section 12 designating the broadcasting station of the program Y to change over the broadcasting station (steps S72 and S73). Consequently, the program playback section 12 causes the display section 22 to display the program Y. On the other hand, if the instruction of the user is the recording, then the operation instruction section 53 issues an inquiry to the recording reservation management section 14 regarding whether or not a recording process is proceeding at present (and, if recording is proceeding then whether the program being recorded is the program Y) to confirm whether or not recording of some other program (program other than the program Y) is proceeding (steps S72 and S74).

If a recording process is not proceeding, then the operation instruction section 53 issues an instruction to the recording reservation management section 14 to record the program Y (step S75). Consequently, the program recording section 11 starts recording of the program Y in accordance with the instruction of the recording reservation management section 14. On the other hand, if a recording process is proceeding, then the program guide displaying section 52 issues an inquiry to the user regarding whether or not the recording process being executed at present should be ended and recording of the program Y should be performed (step S76).

If the user determines to record the program Y, then the operation instruction section 53 issues an instruction to the recording reservation management section 14 to end the recording and then issues another instruction to the recording reservation management section 14 to record the program Y (steps S77 and S78). If an instruction that the recording process being executed at present should not be ended is issued, then the recording process being executed at present is continued.

It is to be noted that, if the user does not issue an instruction to start recording of a designated program after recording of a program being recorded is ended, then an instruction to receive and display the designated broadcasting wave may be issued to the program playback section 12.

Figure 20:
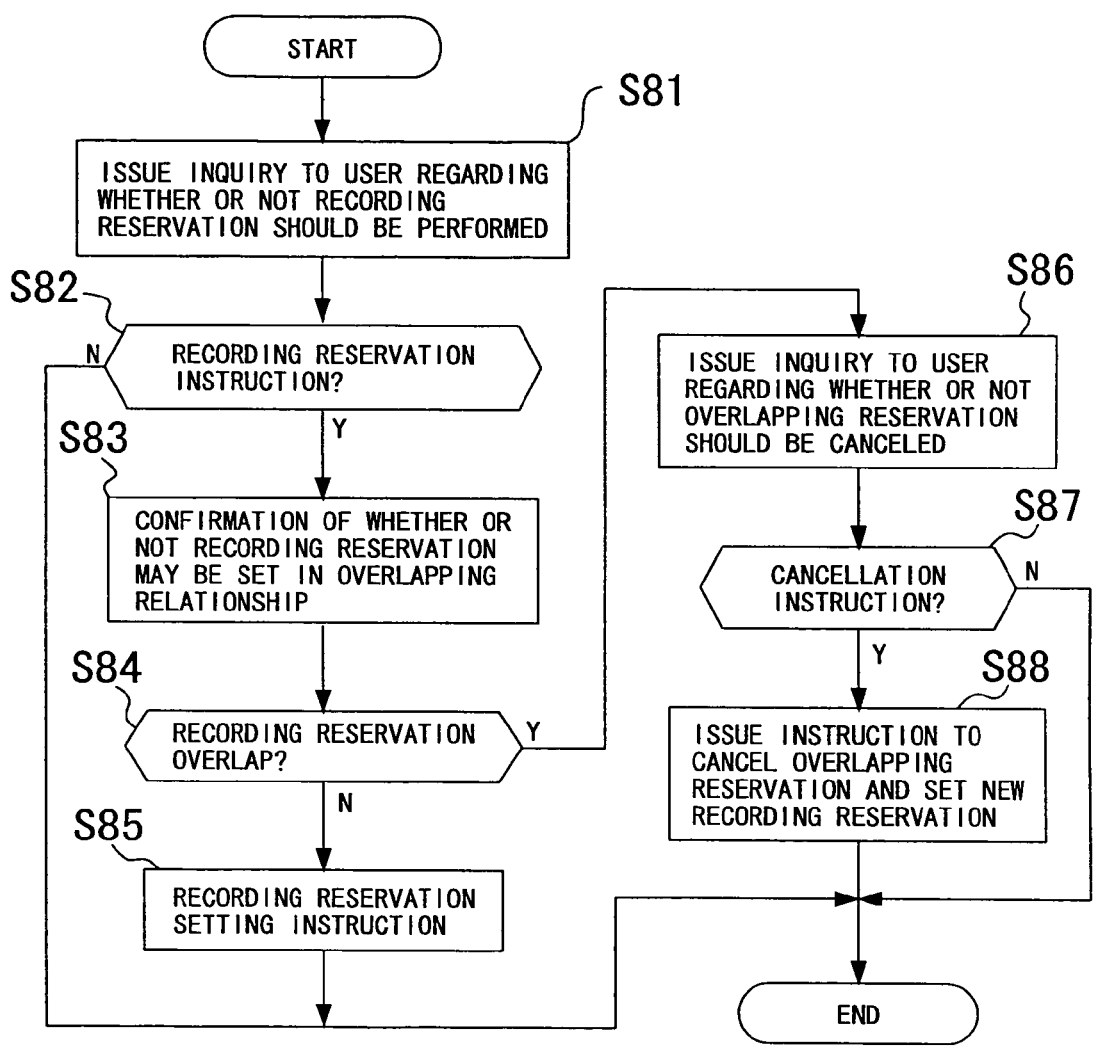
FIG. 20 is a flow chart illustrating an example of a recording reservation process by the program operation terminal apparatus of FIG. 14.

FIG. 20 illustrates an example of a recording reservation process when the recording reservation button is depressed by the user. It is assumed here that the "recording reservation button" provided for the program Z displayed on the display guide is depressed by the user. Referring to FIG. 20, when the "recording reservation button" is depressed, the program guide displaying section 52 issues an inquiry to the user regarding whether or not reservation of recording of the program Z should be performed (step S81). If an instruction to perform such recording reservation is issued from the user, then the program guide displaying section 52 notifies the recording reservation management section 14 of a broadcasting period of the program Z to acquire recording reservation information and confirms whether or not recording is reserved in an overlapping relationship for the same period (steps S82 and 883). If reservation of recording of another program to be broadcast within the broadcasting period of the program Z is not detected, then the operation instruction section 53 issues an instruction to the recording reservation management section 14 to register the program Z as a recording-reserved program into the program recording reservation database 17 (steps S84 and S85).

If some other program to be broadcast within the broadcasting period of the program Z is reserved for recording, then the program guide displaying section 52 issues an inquiry to the user regarding whether or not the recording reservation made already should be cancelled (step S86). If an instruction for such cancellation is issued from the user, then the operation instruction section 53 instructs the recording reservation management section 14 to cancel the reservation of the program reserved for recording and issues an instruction to register the program Z into the program recording reservation database 17 (steps S87 and S88).

It is to be noted that, when the recording reservation button is depressed, reservation of recording may otherwise be performed immediately without issuing an inquiry to the user regarding whether or not recording reservation should be performed.

Figure 21:
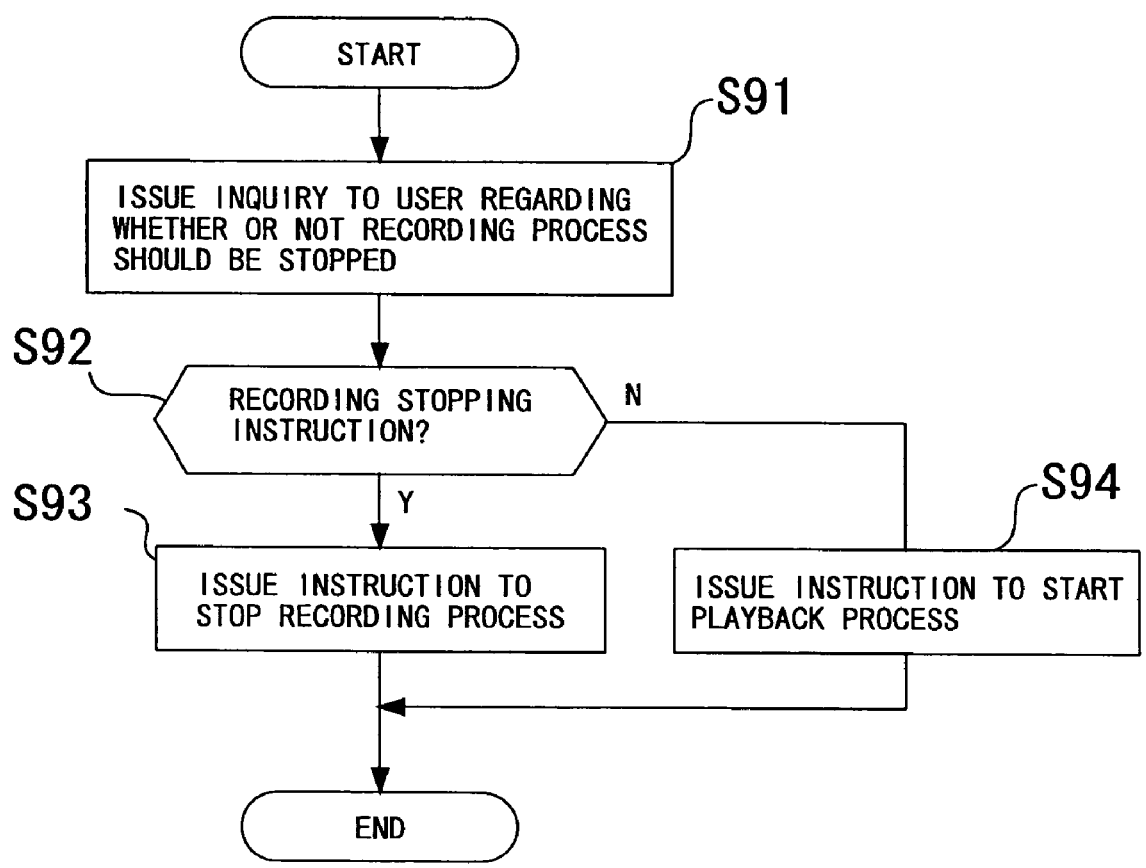
FIG. 21 is a flow chart illustrating an example of a playback starting or recording ending process by the program operation terminal apparatus of FIG. 14.

FIG. 21 illustrates an example of a playback starting or recording ending process when the playback starting/recording ending button is depressed by the user. It is assumed here that the "playback starting/recording ending button" provided for the program S displayed on the program guide is depressed by the user, Referring to FIG. 21, when the "playback starting/recording ending button" is depressed, the program guide displaying section 52 issues an inquiry to the user regarding whether or not recording of the program S should be stopped (step S91). If an instruction to stop recording of the program S is issued by the user (Y in step S92), then the operation instruction section 53 issues an instruction to the program recording section 11 to stop recording through the recording reservation management section 14 (step S93), The program recording section 11 ends the recording process of the program S in accordance with the instruction from the operation instruction section 53.

If the user does not issue an instruction to stop recording (N in step S92), then the operation instruction section 53 issues an instruction to play back the designated program S (step S94).

It is to be noted that, if the user does not issue a playback instruction in response to an inquiry regarding whether or not playback should be performed when an instruction to end recording is not issued from the user, playback of the designated program may be performed.

Figure 22:
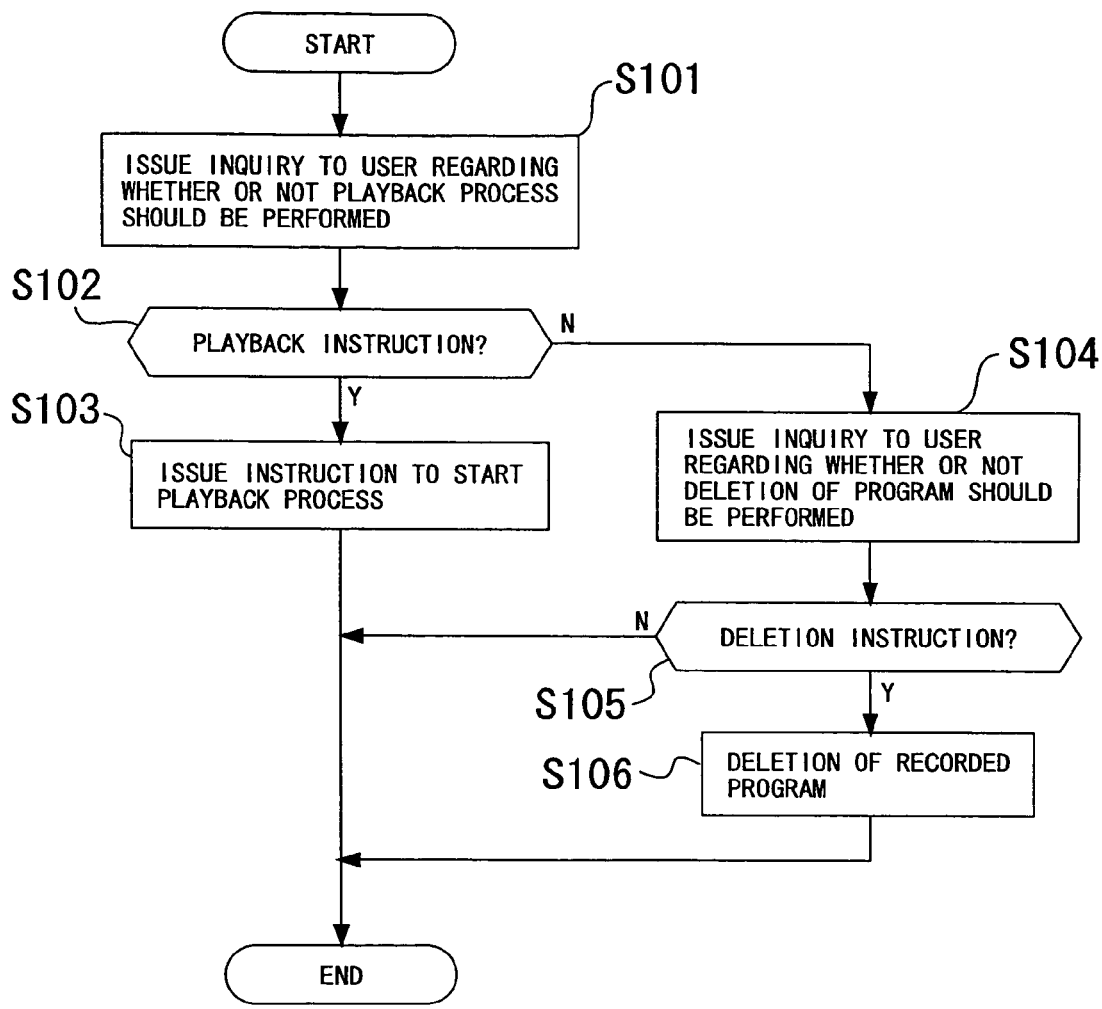
FIG. 22 is a flow chart illustrating an example of a playback starting or program deletion process by the program operation terminal apparatus of FIG. 14.

FIG. 22 illustrates an example of a playback starting or program deletion process when the playback starting/program deletion button is depressed by the user. It is assumed here that the user depresses the "playback starting/program deletion button" provided for the program T displayed on the display guide. Referring to FIG. 22, when the playback starting/program deletion button" is depressed, the program guide displaying section 52 issues an inquiry to the user regarding whether or not the program T should be enjoyed (step S101). If an instruction to enjoy the program T is issued from the user, then the operation instruction section 53 instructs the program playback section 12 to play back the program T (steps S102 and S103). The program playback section 12 starts a playback process of the program in accordance with the playback instruction.

If an instruction not to enjoy the program T is issued from the user, then the program guide displaying section 52 issues an inquiry to the user regarding whether or not the program T should be deleted (step S104). If an instruction to delete the program T is issued from the user, then the operation instruction section 53 deletes the program T stored in the recorded program database 18 (steps S105 and S106).

It is to be noted that, where the "enjoyed program changeover button", "recording starting button" "playback starting button", "recording ending button", "playback starting button" and "playback deletion button" are displayed otherwise in a separated relationship from each other on the program guide, a pertaining portion of the process described above may be performed in response to depression of any of the buttons. For example, if the "recording starting button" is depressed, then part of the process described above with reference to FIG. 19 (for example, steps S74 to S78) may be executed. Further, for example, if the "recording ending button" is depressed, then part of the process described hereinabove with reference to FIG. 21 (processing in the steps except step S94) maybe executed. It is to be noted that the issuance of an inquiry to the user may otherwise be omitted.

As described above, since the program management system 30 is configured such that program condition data are transmitted to a program guide server on the Internet and a program guide on which program conditions of individual programs are reflected is prepared by and returned from the program guide server, an electronic program guide on which program conditions of programs acquired from the Internet are reflected can be used by a browser, and the user can grasp the conditions of the programs readily and further can perform not only recording reservation but also other various processes such as playback, cancellation of a recording reservation, deletion of a recorded program, starting of recording, ending of recording and changeover of a program to be enjoyed based on the program guide. Therefore, the user can perform various program processes readily.

Figure 23:
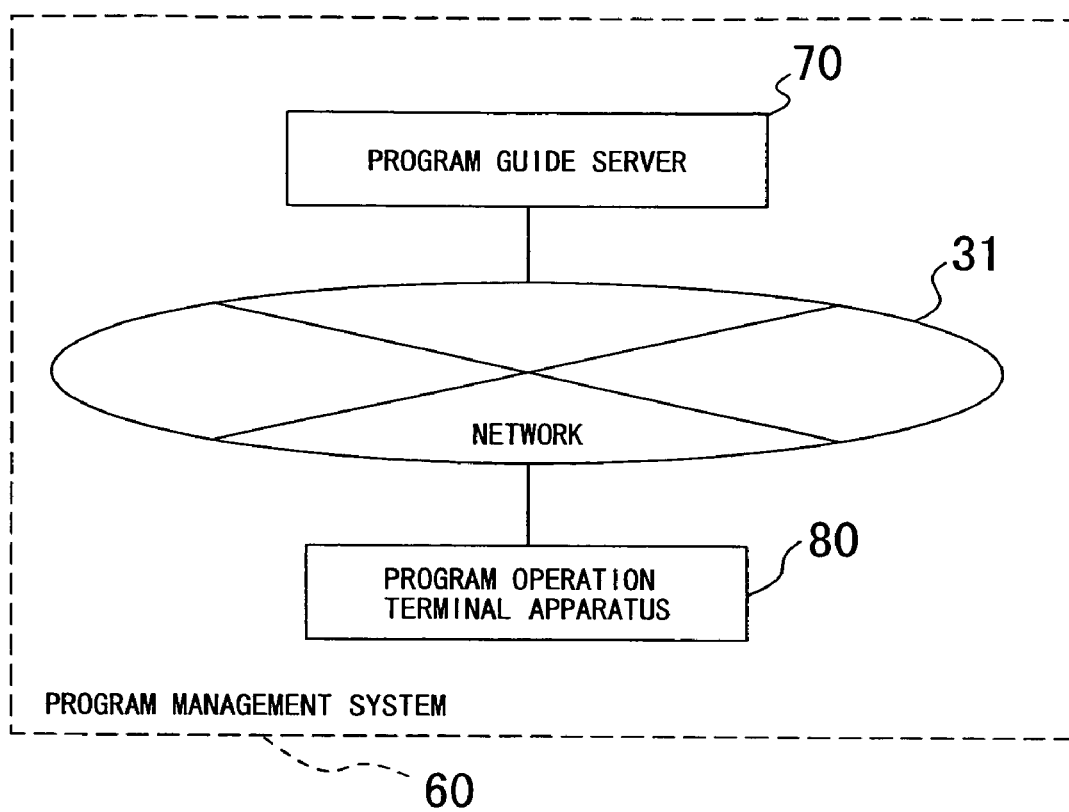
FIG. 23 is a block diagram showing an example of a configuration of another program management system to which the present invention is applied.

Now, another program management system to which the present invention is applied is described with reference to FIG. 23. Referring to FIG. 23, the program management system shown is generally denoted at 60 and includes a program guide server 70 and a program operation terminal apparatus 80. The program guide server 70 and the program operation terminal apparatus 80 are connected to each other by a network 31 such as, for example, the Internet. It is to be noted that any number of such program operation terminal apparatus 80 may be provided in the program management system 60.

Figure 24:
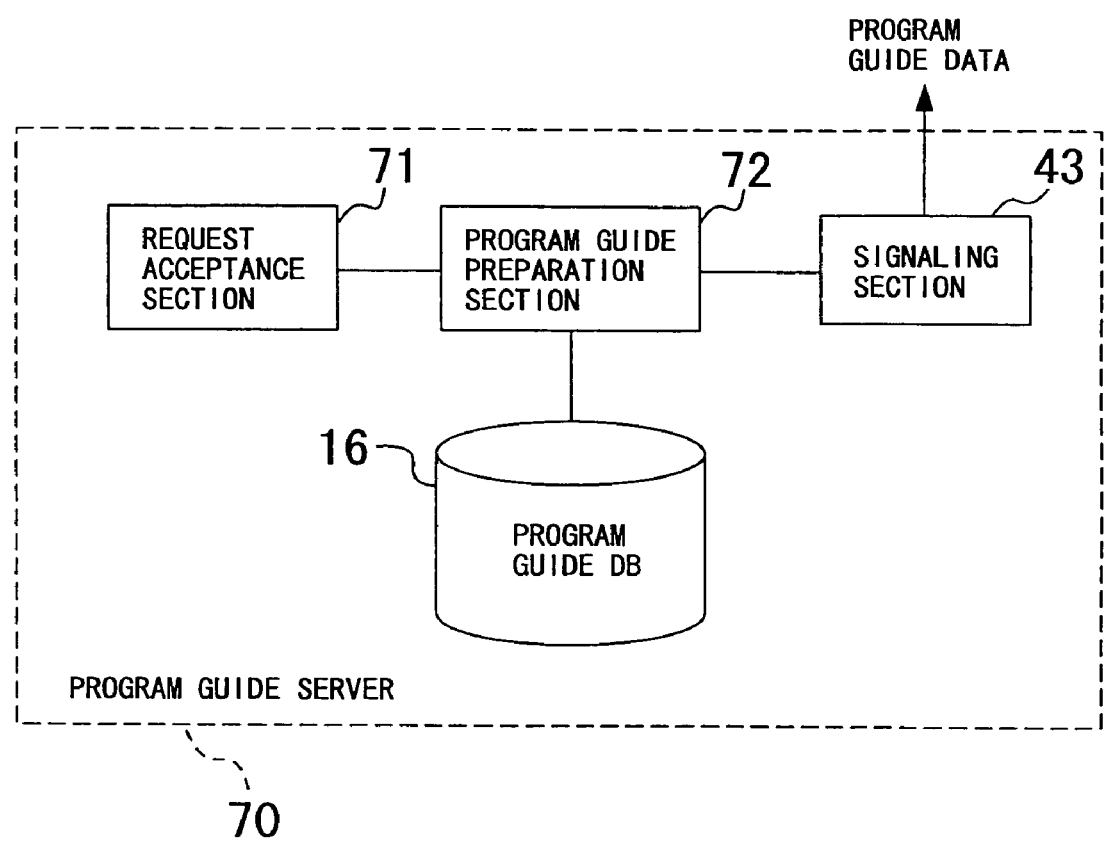
FIG. 24 is a block diagram showing a configuration of a program guide server in the program management system of FIG. 23.

FIG. 24 shows a configuration of the program guide server 70. Referring to FIG. 24, the program guide server 70 includes a program guide database 16 into which data based on which an electronic program guide can be prepared are stored, a request acceptance section 71, a program guide preparation section 72, and a signaling section 43. The program guide server 70 is formed from an information processing apparatus such as, for example, a workstation or a server and has functions as a WWW server. Further, the program guide server 70 has a function of transmitting program guide data to the program operation terminal apparatus 80.

The request acceptance section 71 performs a process of receiving a signaling request of program guide data from the program operation terminal apparatus 80.

The program guide preparation section 72 performs a process of preparing program guide data within a designated period based on data stored in the program guide database 16. The program guide preparation section 72 prepares program guide data within the period designated in a program guide acquisition request and sends the program guide data to the signaling section 43. Thereupon, the program guide preparation section 72 adds, to each program, data for sending an instruction to the operation instruction section 53 of the program operation terminal apparatus 80 and data of a broadcasting stations broadcasting starting time and a broadcasting period of the program.

Figure 25:
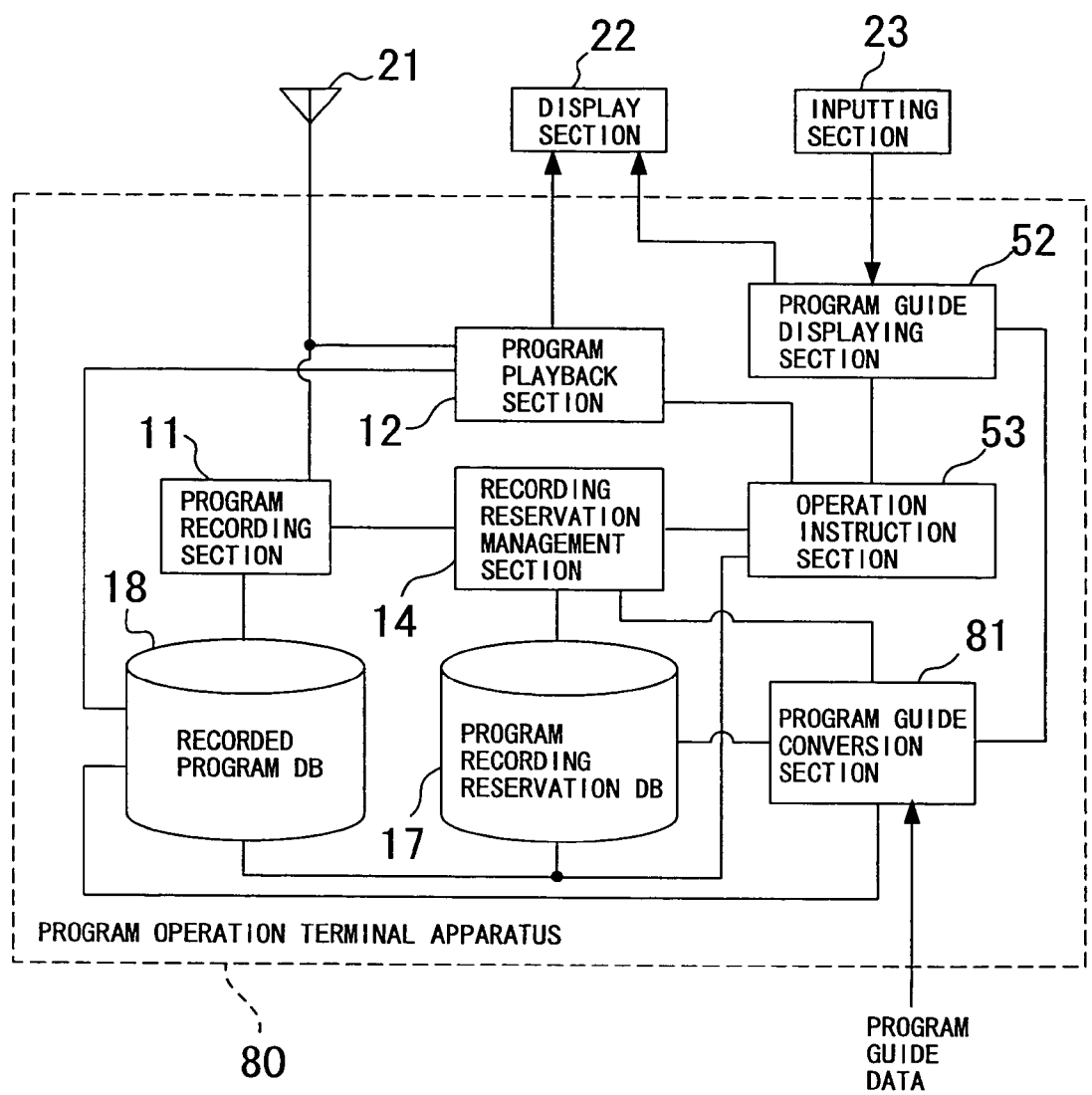
FIG. 25 is a block diagram showing an example of a configuration of a program operation terminal apparatus in the program management system of FIG. 25.

FIG. 25 shows an example of a configuration of the program operation terminal apparatus 80. Referring to FIG. 25, the program operation terminal apparatus 80 includes a program recording reservation database 17, a recorded program database 18, a program recording section 11, a program playback section 12, a recording reservation management section 14, a program guide displaying section 52, an operation instruction section 53, and a program guide conversion section 81.

The program operation terminal apparatus 80 has a function of using a browser incorporated therein to browse a homepage on the network 31. The program operation terminal apparatus 80 further has various functions including a function of transmitting an acquisition request for a program guide to the program guide server 70 and another function of acquiring program guide data including operation instruction data from the program guide server 40 through the network 31. The program operation terminal apparatus 80 is formed from, for example, a personal computer having functions of performing recording and playback of a program, a video tape recorder having environment for connection to the network 31, or a like apparatus. It is to be noted that the program guide data sent from the program guide server 70 to the program operation terminal apparatus 80 are data described, for example, in the HTML or the XML.

The program guide displaying section 52 signals a signaling request for program guide data to the program guide server 70 and displays program guide data received from the program guide conversion section 81.

The operation instruction section 53 acquires information from the program recording reservation database 17, recorded program database 18 and recording reservation management section 14 and issues an operation instruction to the program playback section 12, recording reservation management section 14 or program recording section 11.

In the program guide data sent from the program guide server 70 to the program operation terminal apparatus 80 and described, for example, in the HTML or the XML, operation instruction data for causing the operation instruction section 53 to issue an operation instruction, for example, based on selection of a program by the program playback section 12 are embedded.

The operation instruction is realized by describing a hyperlink to be used to read out data associated with the operation instruction section 53 from the program guide server 70. Data sent from the program guide server 40 in response to designation of a hyperlink include identification information of a broadcasting station (broadcasting station name, channel number, frequency call sign or the like), recording starting time, a recording period, and a type of an operation. By the operation instruction data, identification information of a broadcasting station (broadcasting station name, channel number, frequency call sign or the like), recording starting time, a recording period, and a type of an operation are passed to the operation instruction section 53.

The program guide conversion section 81 acquires information from the program recording reservation database 17, recorded program database 18 and recording reservation management section 14 and performs a process of converting the acquired data into program guide data on which present situations of programs are reflected based on program guide data acquired from the program guide server 70. The program guide data obtained by the conversion are described in the HTML or the XML and transmitted from the program guide conversion section 81 to the program guide displaying section 52.

Figure 26:
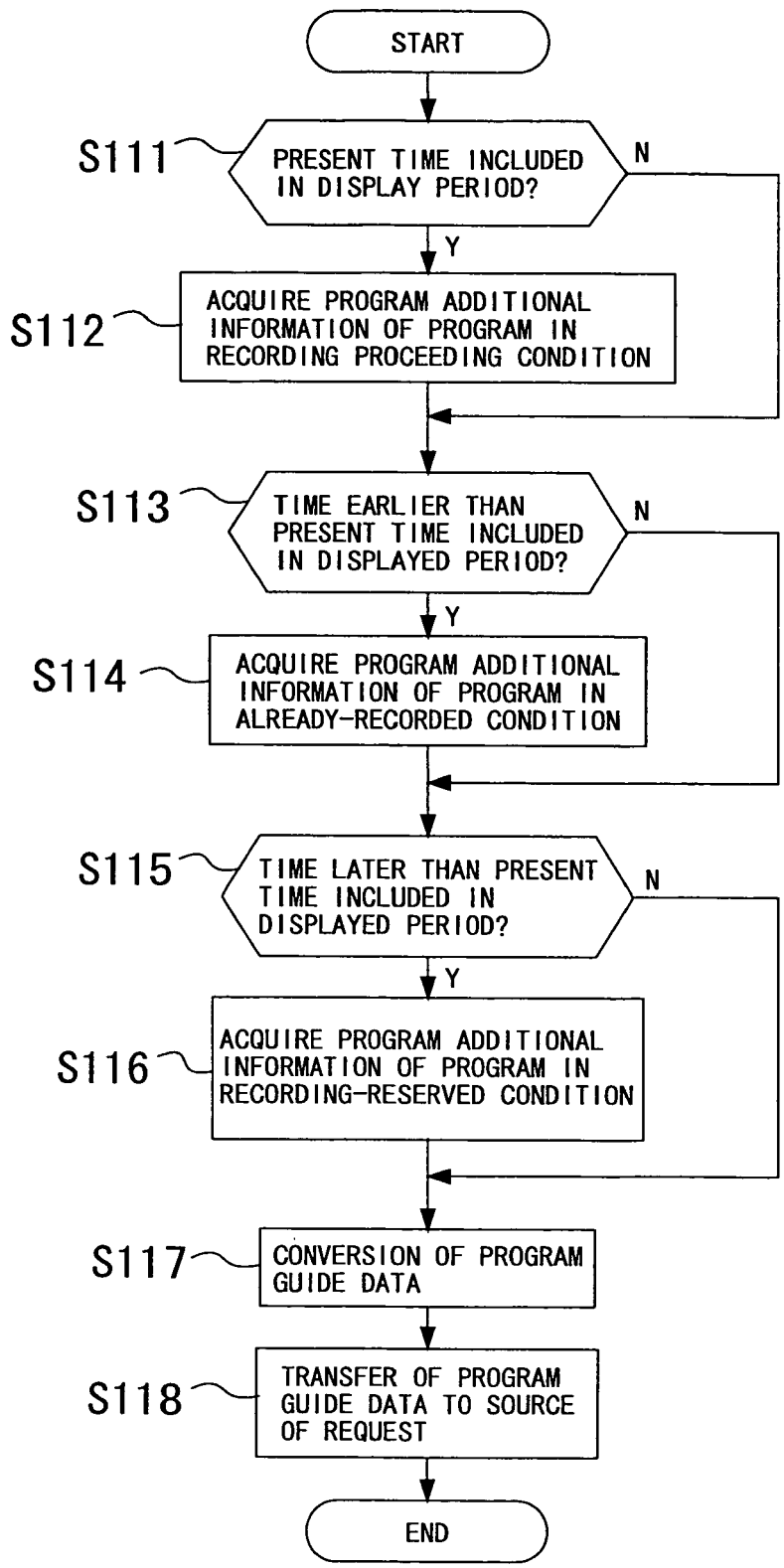
FIG. 26 is a flow chart illustrating an example of a program guide conversion process by the program operation terminal apparatus of FIG. 25.

Now, a program guide conversion process of the program operation terminal apparatus 80 is described FIG. 26 illustrates an example of the program guide conversion process executed by the program guide conversion section 81 of the program operation terminal apparatus 80. Referring to FIG. 26, according to the program guide conversion process illustrated, when program guide data are received from the program guide server 70, the program guide conversion section 81 confirms the present date and hour from a clock incorporated therein.

After the present date and hour are confirmed, the program guide conversion section 81 acquires, if the present time is included in a display period of a program guide acquired from the program guide server 70, program additional information relating to a program being currently recorded from the recording reservation management section 14 (steps S111 and S112).

On the other hand, if a period earlier than the present time is included in the display period of the program guide acquired from the program guide server 70, then the program guide conversion section 81 confirms the stored information of the recorded program database 18 and acquires program additional information relating to a program or programs recorded already included in the period designated by the user from the recorded program database 18 (steps S113 and S114).

Further, if a period later than the present time is included in the display period of the program guide acquired from the program guide server 70, then the program guide conversion section 81 confirms the stored information of the program recording reservation database 17 and acquires program additional information relating to a program or programs reserved for recording included in the period designated by the user from the program recording reservation database 17 (steps S115 and S116).

Then, the program guide conversion section 81 converts the program guide data using the program additional information acquired in steps S112, S114 and S116 (step S117). In the conversion process of the program guide in step S117, a program situation determination process of determining a present situation of each program is executed. Thereupon, data regarding a broadcasting station, broadcasting starting time and a broadcasting period of each program added to the program by the program guide preparation section 72 of the program guide server 70 are used. In the program management system 60, the program guide conversion section 81 determines a present is situation of each program in a similar manner as in the process described hereinabove with reference to FIG. 3.

Accordingly, in the program situation determination process in the present embodiment, the program guide conversion section 81 uses the information acquired from the recording reservation management section 14 for the determination of whether or not the program is a program in a recording proceeding condition, uses the information acquired from the program recording reservation database 17 for the determination of whether or not the program is a program in a recording-reserved condition, and uses the information acquired from the recorded program database 18 for the determination of whether or not the program is a program in an already-recorded condition. The determination of whether or not a program is included in such information depends upon whether or not the broadcasting station and the broadcasting starting time of a program coincide with those of the program.

After a program condition is determined for each program and program guide data on which such program conditions of the programs are reflected are obtained by conversion, the program guide conversion section 81 transfers the resulting program guide data to the program guide displaying section 52 (step S118).

Also in the present program management system 60, various operation buttons corresponding to different program conditions are displayed on the displayed electronic program guide similarly as in, for example, the program management system 30 described hereinabove. Then, in response to depression of one of the operation buttons, the program guide displaying section 52 and/or the operation instruction section 53 issue operation instructions to pertaining components such as the program recording section 11 so that a process corresponding to the depressed operation button is executed.

As described above, the program management system 60 is configured such that a program guide acquired from the program guide server on the Internet is converted into a program guide on which conditions of programs are reflected by the program operation terminal apparatus 80. Thus, private information of program condition data is not sent to the program guide server 70, but a recording condition is sent to the program guide server on the Internet so that the recording condition is reflected on the program guide. Consequently, the user can grasp a condition of each program readily using the electronic program guide acquired from the Internet. Further, the user can use the program guide to perform not only reservation of recording of a program but also playback, cancellation of a reservation of recording, deletion of a program recorded already, starting of recording, ending of recording and changeover of a program to be enjoyed.

It is to be noted that, while, in the program management system 60 described above, operation instruction to the program playback section 12 and so forth is realized by describing a hyperlink for reading out data associated with the operation instruction section 53 from the program guide server 70, it may otherwise be configured such that operation instruction to the program playback section 12 and so forth is realized by describing a hyperlink for reading out data associated with the operation instruction section 53 from a storage apparatus (for example, a memory device or a hard disk) not shown provided in the program operation terminal apparatus 80. Data sent from the storage apparatus not shown provided in the program operation terminal apparatus 80 in response to designation of a hyperlink include identification data of a broadcasting station, recording starting time, a recording period, and a type of an operation.

In the modified program management system just described, the program guide conversion section 81 performs, in step S117 of the process illustrated in FIG. 26, variation of the display form wherein the display form of each program of the program guide data is varied so as to conform with a present situation of the program, embedding of data for sending an operation instruction to the operation instruction section 53 and addition of buttons for starting up the operations based on the program condition data acquired from the recorded program database 18 and so forth.

As described above, the modified program management system is configured such that operation instruction to the program playback section 12 and so forth is realized by describing a hyperlink to be used to read out data associated with the operation instruction section 53 from the storage apparatus provided in the program operation terminal apparatus 80. Therefore a program guide acquired from the program guide server 70 on the Internet can be converted into a program guide which not only reflects present situations of programs but also has operation instruction data added thereto by the program operation terminal apparatus 80, and upon operation, the program guide server 70 is not accessed (in the program management system 60 described above, since, upon operation, a link is clicked and the program guide server 70 is accessed, although the program guide server 70 cannot determine what operation has been performed, it can grasp for what program an operation has been performed). Thus, operation information of the user is not transmitted to the program guide server 70, and effects similar to those of the program management system 60 described above can be anticipated.

Figure 27:
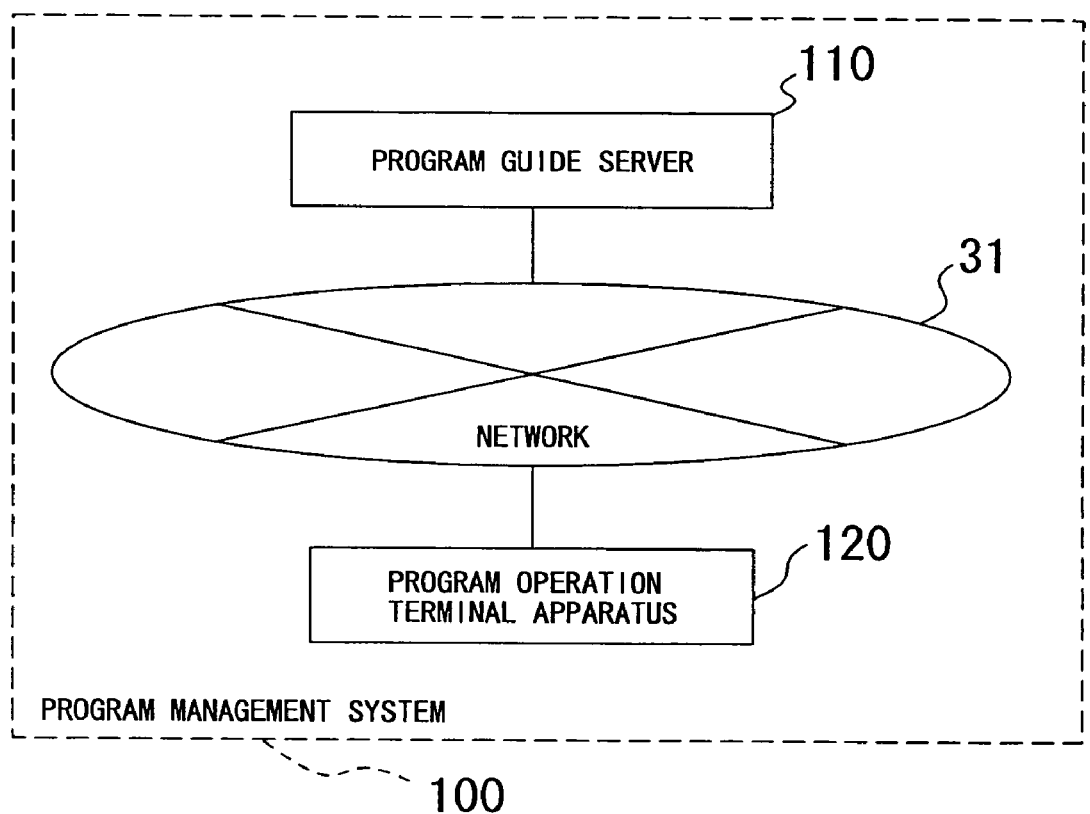
FIG. 27 is a block diagram showing an example of a configuration of a further program management system to which the present invention is applied.

Now, a further program management system to which the present invention is applied is described with reference to FIG. 27. Referring to FIG. 27, the program management system shown is generally denoted at 100 and includes a program guide server 110 and a program operation terminal apparatus 120. The program guide server 110 and the program operation terminal apparatus 120 are individually connected to a network 31 such as, for example, the Internet. It is to be noted that any number of such program operation terminal apparatus 120 may be provided.

Figure 28:
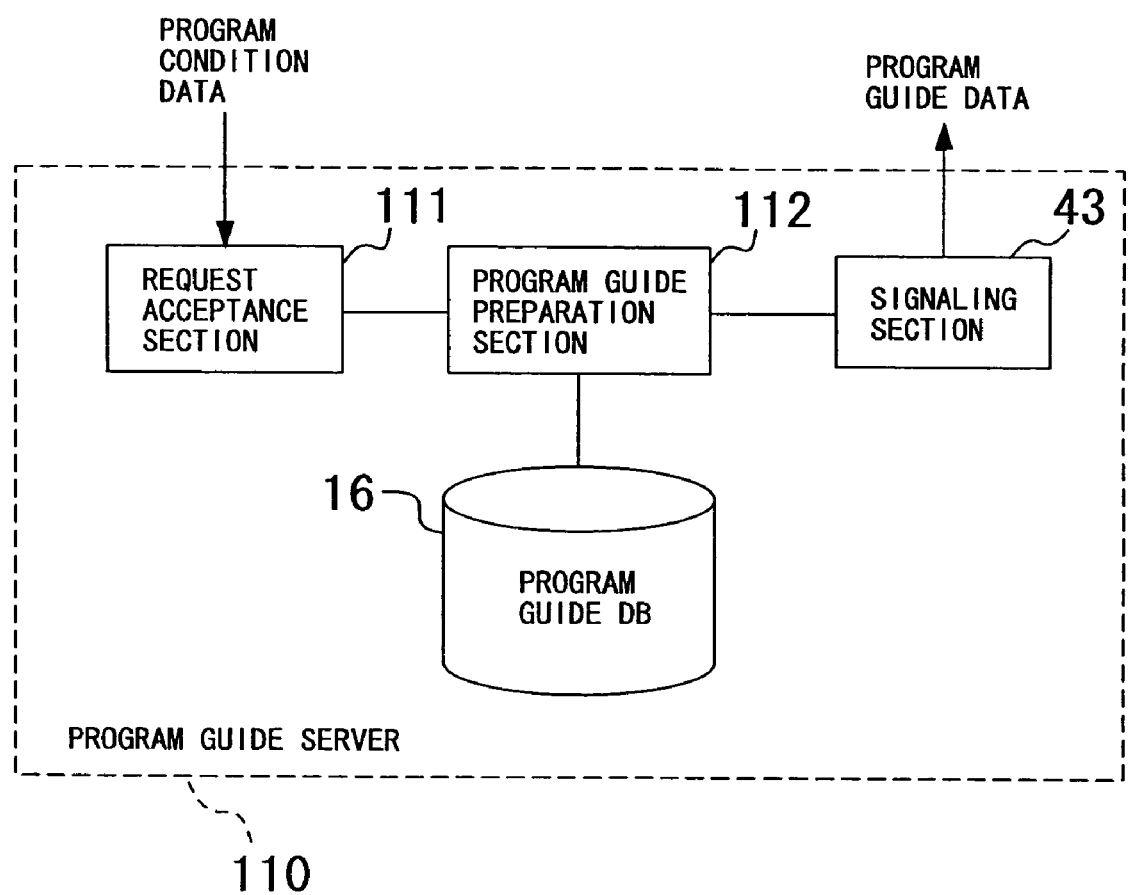
FIG. 28 is a block diagram showing an example of a configuration of a program guide server in the program management system of FIG. 27.

FIG. 2B shows a block diagram showing a configuration of the program guide server 110. Referring to FIG. 28, the program guide server 110 includes a program guide database 16 into which data based on which an electronic program guide can be prepared are stored, a request acceptance section 111, a program guide preparation section 112, and a signaling section 43. The program guide server 110 is formed from an information processing apparatus such as, for example, a workstation or a server and has functions as a WWW server. Further, the program guide server 110 has a function of transmitting program guide data to the program operation terminal apparatus 120 and another function of receiving program condition data and a program guide acquisition request from the program operation terminal apparatus 120.

The request acceptance section 111 performs signaling request for program guide data from the program operation terminal apparatus 120 and a reception process of program condition data.

The program guide preparation section 112 performs a process of preparing program guide data for a designated period based on data stored in the program guide database 16 and program condition data acquired from the program operation terminal apparatus 120. The program guide preparation section 112 prepares program guide data for a period designated in a program guide acquisition request and sends the program guide data to the signaling section 43. Thereupon, the program guide preparation section 112 adds, to each program, data for sending an instruction to the operation instruction section 53 of the program operation terminal apparatus 120 and data of a broadcasting station, broadcasting starting time and a broadcasting period of the program.

Figure 29:
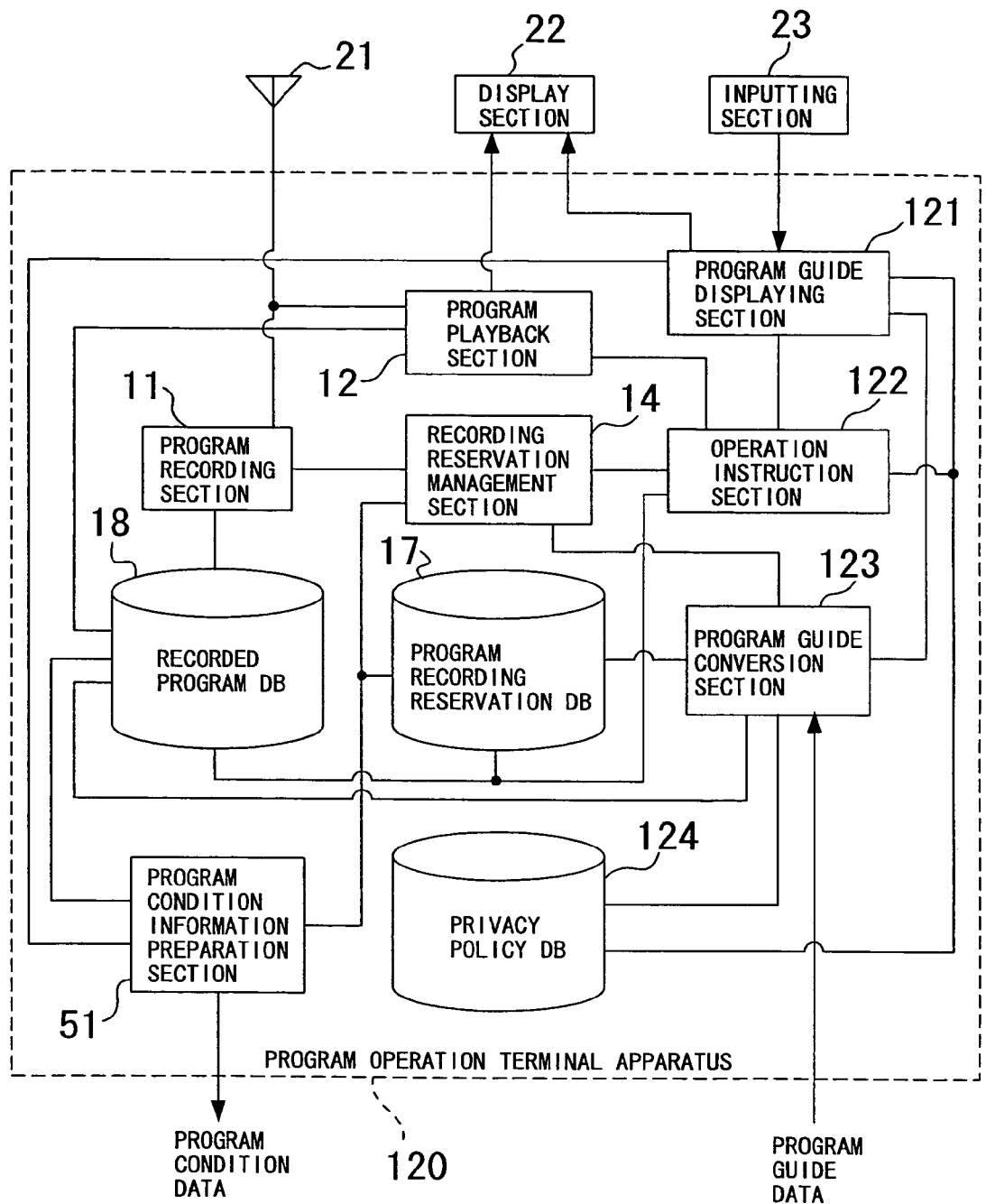
FIG. 29 is a block diagram showing a configuration of a program operation terminal apparatus in the program management system or FIG. 27.

FIG. 29 is a block diagram showing an example of a configuration of the program operation terminal apparatus 120 Referring to FIG. 29, the program operation terminal apparatus 120 includes a program recording section 11, a program playback section 12, a recording reservation management section 14, a program recording reservation database 17, a recorded program database 18, a program condition information preparation section 51, a program guide displaying section 121, an operation instruction section 122, a program guide conversion section 123, and a privacy policy database (privacy policy DB) 124.

The program operation terminal apparatus 120 has a function of using a browser incorporated therein to browse a homepage on the network 31. Further, the program operation terminal apparatus 120 has various other functions including function of transmitting a request for acquisition of a program guide and program condition data to the program guide server 110 and a function of acquiring program guide data, which reflects present situations of programs, from the program guide server 110 through the network 31. The program operation terminal apparatus 120 is formed from, for example, a personal computer having a function of recording and playing back a program, a video tape recorder having environment for connection to the network 31, or a like apparatus. It is to be noted that the program guide data sent from the program guide server 110 to the program operation terminal apparatus 120 are described, for example, in the HTML or the XML.

The program guide displaying section 121 signals an instruction to the program condition information preparation section 51 to signal A request for signaling of a program guide or signals a request for signaling of a program guide to the program guide server 110. Further, the program guide displaying section 121 performs a process of displaying a program guide based on program guide data received from the program guide conversion section 123 or the program guide server 110.

The operation instruction section 122 acquires information from the program recording reservation database 17, recorded program database 18 and recording reservation management section 14 and issues an operation instruction to the program playback section 12, recording reservation management section 14 or program recording section 11.

The program guide conversion section 123 acquires information from a program guide database, the program recording reservation database 17, the recorded program database 18 and the recording reservation management section 14 and performs a process of converting program guide data received from the program guide server 110 into program guide data based on present situations of programs.

The privacy policy database 124 has a privacy level recorded therein. In particular, three different levels from level 1 to level 3 are set in the privacy policy database 124. The level 1 signifies "permission of signaling of program condition data". The level 2 signifies "inhibition of signaling of program condition data while operation instruction data of the operation instruction section 122 are prepared by the program guide server". The level 3 signifies "inhibition of signaling of program condition data while operation instruction data of the operation instruction section 122 are prepared by the program operation terminal apparatus 120".

It is to be noted that, in the program management system 100, program guide data sent from the program guide server 110 to the program operation terminal apparatus 120 are similar to those of the program management system 30 or 60 described hereinabove. Further, program guide data sent from the program guide conversion section 123 to the program guide displaying section 121 are similar to those in the program management system 60 described hereinabove.

Further, in the present program management system 100, to a program guide request described above which is sent from the program operation terminal apparatus 120 to the program guide server 110, the level recorded in the privacy policy database 124 is added.

The program operation terminal apparatus 120 performs processing similar to that in the program management system 30 described hereinabove when the level recorded in the privacy policy database 124 is the level 1, but performs processing similar to that in the program management system 60 described hereinabove when the level recorded in the privacy policy database 124 is the level 2, and performs processing similar to that in the modification to the program management system 60 described hereinabove when the level recorded in the privacy policy database 124 is the level 3.

The program guide server 110 performs processing similar to that in the program management system 30 described hereinabove when the privacy level added to the program guide request is the level 1, but performs processing similar to that in the program management system 60 described hereinabove then the privacy level is the level 2, and performs processing similar to that in the modification to the program management system 60 described hereinabove when the privacy level is the level 3.

Since the operation is varied in response to the setting of the user as described above, the user can grasp conditions of individual programs readily using an electronic program guide acquired from the Internet in response to the privacy level desired by the user. Further, the user can use the program guide to perform not only reservation of recording of a program but also playback, cancellation of a reservation of recording, deletion of a program recorded already, starting of recording, ending of recording and changeover of a program to be enjoyed.

It is to be noted that some charge may be collected from the user each time an electronic program guide is distributed or the like. In this instance, the charge to be collected from the user may be varied in accordance with the privacy level, that is by what amount of the privacy information of the user is sent to the server. For example, users are divided into three types including a user who provides program condition data (a comparatively low charge), another user who does not provide program condition data but accesses for starting up of an application (a medium charge) and a further user who only accesses a program guide (a comparatively high charge), and the charge to be collected is set different among the different types.

In this instance, the program guide server 110 stores program condition data and an access history for each user. The administrator of the server can statistically process the data and utilize the processed data as data of the degrees of interest regarding programs.

It is to be noted that a program management apparatus, a program operation terminal apparatus or a program guide server in all of the embodiments described above executes its processing in accordance with a control program for causing a computer of them to execute the processing. It is to be noted that the control program may be, for example, installed in a hard disk apparatus, recorded on and read out from a recording medium, or distributed on a network and fetched into a hard disk or the like.

Further, while, in the embodiments described above, recording or playback of a television program is involved, a radio program or some other program may be recorded or played back.

While preferred embodiments of the present invention have been described using specific terms, such description is for illustrative purposes only, and it is to be understood that changes and variations may be made without departing from the spirit or scope of the following claims.

What is claimed is:

1. A program processing system for performing a program process using an electronic program guide, comprising:
    a communication network;
    a program processing apparatus for executing a program process, said apparatus having
        a database for storing program reservation data identifying a reservation of particular externally broadcast programs for recording,
        means for preparing a program condition data based, at least in part, on said reservation data,
        means for receiving and storing a program condition data control signal having at least a first value and a second value,
        means transmitting the stored program condition data control signal through said communication network, and
        means for transmitting, based at least in part on said program condition data control signal, said program condition data through said network, wherein said transmitting selectively transmits said condition data when said program condition data control signal has said first value and is inhibited from transmitting said condition data when said program condition data control signal has said second value;
    an electronic program guide preparation server, connected to said communication network, for preparing an electronic program guide,
    wherein said electronic program guide preparation server includes reception means for receiving said program condition data control signal and said condition data through said communication network, means for preparing an electronic program guide including a display form showing a current status of each of the externally broadcast programs based on said received condition data, and transmission means for transmitting the prepared electronic program guide, including the display form, to said program processing apparatus,
    wherein said program processing apparatus further includes
        means for displaying the electronic program guide received through said communication network, wherein the program guide displays said current status for each said program displayed, and wherein user selection of a program displays a selection section for performing a process prompting the user to select recording options available for the program in accordance with said current status,
        means for recording said externally broadcast programs,
        a recorded program database for storing information identifying externally broadcast programs that have been recorded by said means for recording said externally broadcast programs,
        a program playback section for retrieving and playing externally broadcast programs stored in said recorded program database;
        inputting means for receiving user commands relating to the electronic program guide displayed by said means for displaying the electronic program guide received from said electronic program guide preparation server, wherein said receiving includes receiving user commands identifying an acquisition period associated with said electronic program guide, said acquisition period being a period within which a plurality of programs within said program guide may be broadcast; and
        an operating instruction section for controlling said program playback section based on said electronic program guide displayed by said means for displaying and further based on said user commands,
    wherein said preparing performed by said means for preparing a program condition data includes preparing the program condition data further based on said information stored in said recorded program database identifying externally broadcast programs that have been recorded, and
    wherein said preparing performed by said means for preparing an electronic program guide further includes;
        identifying a present date and time from an external clock;
        determining, based on the identified present date and time and the user-input acquisition period received at said inputting means, a time relation of the identified present time and the user-input acquisition period as being one of the identified present date and time being within the user-input acquisition period, the user-input acquisition period being earlier than the identified present date and time, and the identified user-input acquisition period being later than the identified present date and time,
        determining, in response to determining the identified present date and time being within the user-input acquisition period, whether or not a program within the user-input acquisition period is being currently recorded,
        confirming, in response to determining the user-input acquisition period as earlier than the identified present time, stored information in the recorded program database relating to recorded programs within the user-input acquisition period, and
        confirming, in response to determining the user-input acquisition period as later than the identified present time, stored information in the database for storing program reservation data relating to programs within the user-input acquisition period.

2. The program processing system of claim 1, wherein a monetary consideration which, differs depending upon said privacy level data sent from said program processing apparatus, is imposed for said electronic program guide preparation server sending said electronic guide to said program processing apparatus.

3. The program processing system of claim 1, wherein said preparing performed by said means for preparing an electronic program includes, in response to said determining whether or not a program within the user-input acquisition period is being currently recorded determining the identified present date and time being within the user-input acquisition period, identifying for at least one program within the user-input acquisition period whether or not the program is being recorded, and displaying a corresponding information on said means for displaying the electronic program guide.

4. The program processing system of claim 3, wherein said displaying a corresponding information includes displaying, in response to identifying the program being recorded, a request for a user input command regarding the recording.

5. The program processing system of claim 3, wherein said displaying a corresponding information includes displaying, in response to identifying the program being not recorded, a request for a user input command to record the program.

6. The program processing system of claim 5, wherein said means for recording said externally broadcast programs detects, in response to receiving the user input command to record the program, whether another program is being recorded and, in response detecting another program being recorded, displays on said means for displaying the electronic program guide a request for a user input command for selecting a program.

7. The program processing system of claim 1, wherein said confirming performed in response to determining the user-input acquisition period as earlier than the identified present time of a stored information in the recorded program database includes acquiring, from the recorded program database, a present situation information regarding a recorded status and a broadcast time of at least one program within the user-input acquisition period.

8. The program processing system of claim 1, wherein said confirming performed in response to determining the user-input acquisition period as later than the identified present time of a stored information in the recorded program database includes acquiring, from the database for storing program reservation data, a present situation information regarding a reservation status of at least one program within the user-input acquisition period.

9. The program processing system of claim 1, wherein preparing performed by said means for preparing an electronic program guide includes receiving user preferences regarding a format for displaying present situations of channels within said user-input acquisition period, and preparing said electronic program guide for particularly display of the electronic program guide, on said means for displaying the electronic program guide, in accordance with said user preferences.

10. The program processing system of claim 1, wherein said preparing performed by said means for preparing an electronic program guide includes preparing the electronic format guide to display different user command options based on determining the identified present date and time being within the user-input acquisition period, the user-input acquisition period being earlier than the identified present date and time, and the identified user-input acquisition period being later than the identified present date and time.

* * * * *